(12) United States Patent
Igarashi et al.

(10) Patent No.: US 11,313,107 B2
(45) Date of Patent: Apr. 26, 2022

(54) WORK MACHINE

(71) Applicant: HITACHI CONSTRUCTION MACHINERY CO., LTD., Tokyo (JP)

(72) Inventors: Teruki Igarashi, Tsuchiura (JP); Shiho Izumi, Hitachinaka (JP); Ryu Narikawa, Mito (JP); Shuuichi Meguriya, Ishioka (JP); Hiroki Takeuchi, Tsukuba (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 255 days.

(21) Appl. No.: 16/639,793

(22) PCT Filed: Oct. 30, 2018

(86) PCT No.: PCT/JP2018/040246
§ 371 (c)(1),
(2) Date: Feb. 18, 2020

(87) PCT Pub. No.: WO2019/088065
PCT Pub. Date: May 9, 2019

(65) Prior Publication Data
US 2020/0181883 A1    Jun. 11, 2020

(30) Foreign Application Priority Data

Oct. 30, 2017    (JP) .............................. JP2017-208902

(51) Int. Cl.
*E02F 9/26*    (2006.01)
*E02F 3/32*    (2006.01)
(Continued)

(52) U.S. Cl.
CPC ................ *E02F 9/262* (2013.01); *E02F 3/32* (2013.01); *E02F 3/435* (2013.01); *E02F 9/2004* (2013.01); *E02F 9/2033* (2013.01); *E02F 9/2271* (2013.01)

(58) Field of Classification Search
CPC . E02F 3/32; E02F 3/435; E02F 9/2004; E02F 9/2033; E02F 9/2271; E02F 9/262;
(Continued)

(56) References Cited

U.S. PATENT DOCUMENTS 5,735,065 A * 4/1998 Yamagata ............. E02F 9/2033
                                                                37/348
7,610,136 B2 * 10/2009 Okamura ............. E02F 9/2207
                                                                701/50
(Continued)

FOREIGN PATENT DOCUMENTS

| JP | 2010-121441 A | 6/2010 |
| JP | 6062115 B1 | 1/2017 |
| WO | 2015/025986 A1 | 2/2015 |

OTHER PUBLICATIONS

International Search Report of PCT/JP2018/040246 dated Jan. 29, 2019.
International Preliminary Report on Patentability received in corresponding International Application No. PCT/JP2018/040246 dated May 14, 2020.

*Primary Examiner* — Tyler J Lee
(74) *Attorney, Agent, or Firm* — Mattingly & Malur, PC

(57) ABSTRACT

A controller outputs a first velocity (first limiting velocity) as a limiting velocity for a boom cylinder when a boom lowering operation amount is smaller than a first operation amount, and outputs a second velocity when the boom lowering operation amount is equal to or larger than the first operation amount. The first velocity is set to decrease according to a decrease in a target surface distance. The second velocity is defined by a weighted average of the first velocity and a third velocity (second limiting velocity) set to
(Continued)

change according to one of the target surface distance and the boom lowering operation amount of the operation device, and is set such that an increase in the boom lowering operation amount reduces a weight for the first velocity while increasing a weight for the third velocity.

6 Claims, 20 Drawing Sheets

(51) Int. Cl.
*E02F 3/43* (2006.01)
*E02F 9/20* (2006.01)
*E02F 9/22* (2006.01)

(58) Field of Classification Search
CPC ........ G05B 19/416; G05B 2219/43203; G05B 2219/45012
See application file for complete search history.

(56) References Cited

U.S. PATENT DOCUMENTS

| | | | |
|---|---|---|---|
| 9,481,976 B2* | 11/2016 | Kami | G05B 19/416 |
| 9,803,340 B2* | 10/2017 | Shimano | E02F 3/32 |
| 9,834,905 B2* | 12/2017 | Matsuyama | E02F 9/2285 |
| 11,041,289 B2* | 6/2021 | Ishibashi | E02F 9/262 |
| 11,174,619 B2* | 11/2021 | Ishibashi | E02F 9/2037 |
| 2005/0177292 A1 | 8/2005 | Okamura et al. | |
| 2011/0318155 A1* | 12/2011 | Okamura | E02F 9/2203 414/685 |
| 2014/0200776 A1* | 7/2014 | Matsuyama | E02F 9/264 701/50 |
| 2016/0040398 A1* | 2/2016 | Kitajima | E02F 3/32 701/50 |
| 2016/0145827 A1 | 5/2016 | Kami et al. | |
| 2017/0268204 A1 | 9/2017 | Shimano et al. | |

* cited by examiner

WORK MACHINE

TECHNICAL FIELD

The present invention relates to a work machine that can execute machine control.

BACKGROUND ART

A hydraulic excavator, used as a work machine, may include a control system assisting excavating operation of an operator. Specifically, there is known a control system that operates as follows in a case where excavating operation (for example, an instruction on arm crowding) is input to the control system via an operation device: the control system executes control for forcibly operating, among a boom cylinder, an arm cylinder, and a bucket cylinder that drive a work device, at least the boom cylinder such that, on the basis of a positional relationship between a target surface and a tip of the work device (for example, a claw tip of a bucket), the position of the tip of the work device (also referred to as a front work device) is held on the target surface and in an area above the target surface (the control involves, for example, extending the boom cylinder and forcibly performing a boom raising operation). The use of the control system limiting an area where the tip of the work device is movable as described above facilitates finishing of an excavation face and forming of a slope face. Such control may hereinafter be referred to as an "area limiting control" or a "leveling control." In addition, "Machine Control (MC)" or "intervention control (for operator control)" may refer to control in general in which, while the operation device is being operated, a control signal that operates a predetermined actuator in accordance with predefined conditions is calculated, and in which the actuator is controlled on the basis of the control signal.

In regard to the machine control (MC), Patent Document 1 (Japanese Patent No. 6062115) discloses a control system for a work vehicle, the control system including a distance acquisition section that acquires a distance between a designed terrain profile representing a target shape of a work object and a work device, a work aspect determination section that determines as to whether or not a leveling determination condition indicating that work executed by the work device is leveling is satisfied and whether or not a compaction determination condition indicating that work executed by the work device is compaction is satisfied, and a control determination section that determines execution of levelling control for controlling the work device such that the work device moves along the designed terrain profile when the levelling determination condition is satisfied, and determines execution of compaction control for limiting velocity of the work device moving toward the designed terrain profile according to the distance between the work device and the designed terrain profile when the compaction determination condition is satisfied, the control determination section maintaining the compaction control when the leveling determination condition is satisfied during execution of the compaction control.

PRIOR ART DOCUMENT

Patent Document

Patent Document 1: Japanese Patent No. 6062115

SUMMARY OF THE INVENTION

Problems to be Solved by the Invention

In Patent Document 1, a method for limiting a boom lowering velocity is switched depending on whether or not an operation condition satisfies the compaction determination condition. Specifically, in a case where a rapid boom lowering operation is performed, satisfaction of the compaction determination condition is determined, and boom lowering velocity limitation control is switched from velocity limitation control based on second limiting velocity information 12 used for leveling control to velocity limitation control based on first limiting velocity information 11 used for compaction control. The first limiting velocity information 11 and the second limiting velocity information 12 define respective boom lowering limiting velocities corresponding to the distance between the work device and the designed surface. However, in substantially all of a distance range, a significant difference occurs between the limiting velocity defined on the basis of the first limiting velocity information 11 and the limiting velocity defined on the basis of the second limiting velocity information 12. Thus, a significant difference in velocity tends to occur when the limiting velocity control is switched, and shock is likely to occur in a machine body or an uncomfortable feeling is likely to be involved in operation.

In particular, an operation method for stopping work of stopping the tip of the work device on the ground surface by a boom lowering operation is very similar to an operation method for compaction work of pressing the tip of the work device against the ground surface by the boom lowering operation in that only the boom lowering operation is performed. Thus, determining which of the works is to be executed on the basis of the operation method is difficult. For example, relaxing the compaction determination condition (in Patent Document 1, increasing r1) leads to switching from the second limiting velocity for the leveling control to the first limiting velocity for the compaction control in a situation unintended by the operator. Thus, the problem such as shock given to the machine body or an uncomfortable feeling involved in operation caused by rapid change in velocity still occurs. On the other hand, making the compaction determination condition stricter (in Patent Document 1, reducing r1) prevents the compaction determination condition from being satisfied in a situation where the operator desires to perform compaction, and velocity limitation control that is based on the second limiting velocity information 12 used for leveling control is likely to be executed. This makes the work inefficient and increases mental fatigue of the operator.

An object of the present invention is to provide a work machine that can execute the compaction work as intended by the operator without causing the operator to feel the shock occurred in the machine body or to feel uncomfortable with operation.

Means for Solving the Problems

The present application includes a plurality of means for solving the above-described problems, and one example of the means is a work machine including an articulated work device including a boom and an arm, a plurality of hydraulic actuators including a boom cylinder that drives the boom, the plurality of hydraulic actuators driving the work device, an operation device that gives an instruction on an operation of the work device in response to an operation by an operator, and a controller that controls, during the operation of the operation device, at least one of the plurality of hydraulic actuators such that the work device is positioned on or above a predetermined target surface, and controls a velocity of the boom cylinder on the basis of a boom lowering operation amount of the operation device. The controller calculates, as a limiting velocity for the boom cylinder, a first velocity set to decrease according to a decrease in a distance between the target surface and the work device when the boom lowering operation amount of the operation device is smaller than a first operation amount, and calculates a second velocity as a limiting velocity for the boom cylinder when the boom lowering operation amount of the operation device is equal to or larger than the first operation amount, the second velocity is defined by a weighted average of the first velocity and a third velocity set to change according to one of the distance between the target surface and the work device and the boom lowering operation amount of the operation device, and is set such that an increase in the boom lowering operation amount reduces a weight for the first velocity while increasing a weight for the third velocity, and when the velocity of the boom cylinder based on the boom lowering operation amount of the operation device is higher than the limiting velocity, the velocity of the boom cylinder is limited to the limiting velocity.

Advantage of the Invention

According to the present invention, the compaction work can be executed as intended by the operator without causing the operator to feel the shock occurred in the machine body or to feel uncomfortable with operation.

BRIEF DESCRIPTION OF THE DRAWINGS

FIG. 6 is a diagram of an example of a display screen of a display device 53a.

MODES FOR CARRYING OUT THE INVENTION

Embodiments of the present invention will hereinafter be described using the drawings. Note that, in the following, a hydraulic excavator including a bucket 10 as a work implement (attachment) at a tip of a work device will be illustrated but the present invention may be applied to a work machine including an attachment other than the bucket. Furthermore, the present invention is also applicable to a work machine other than a hydraulic excavator as long as the work machine includes an articulated work device configured by coupling a plurality of link members (an attachment, an arm, a boom, and the like).

Additionally, in the specification, in regard to the meaning of the term "on," "above," or "below" used along with a term indicating a certain shape (for example, a target surface or a designed surface), "on" means a "surface" of the certain shape, "above" means a "position higher than the surface" of the certain shape, and "below" means a "position lower than the surface" of the certain shape. Additionally, in the description below, in a case where a plurality of the same components are present, an alphabet may be added to the end of a reference symbol (number). However, the plurality of components may be represented collectively by omitting the alphabet. For example, when three pumps 300a, 300b, and 300c are present, the pumps may collectively be represented as a pump 300.

First Embodiment

—General Configuration of Hydraulic Excavator—

Figure 1:
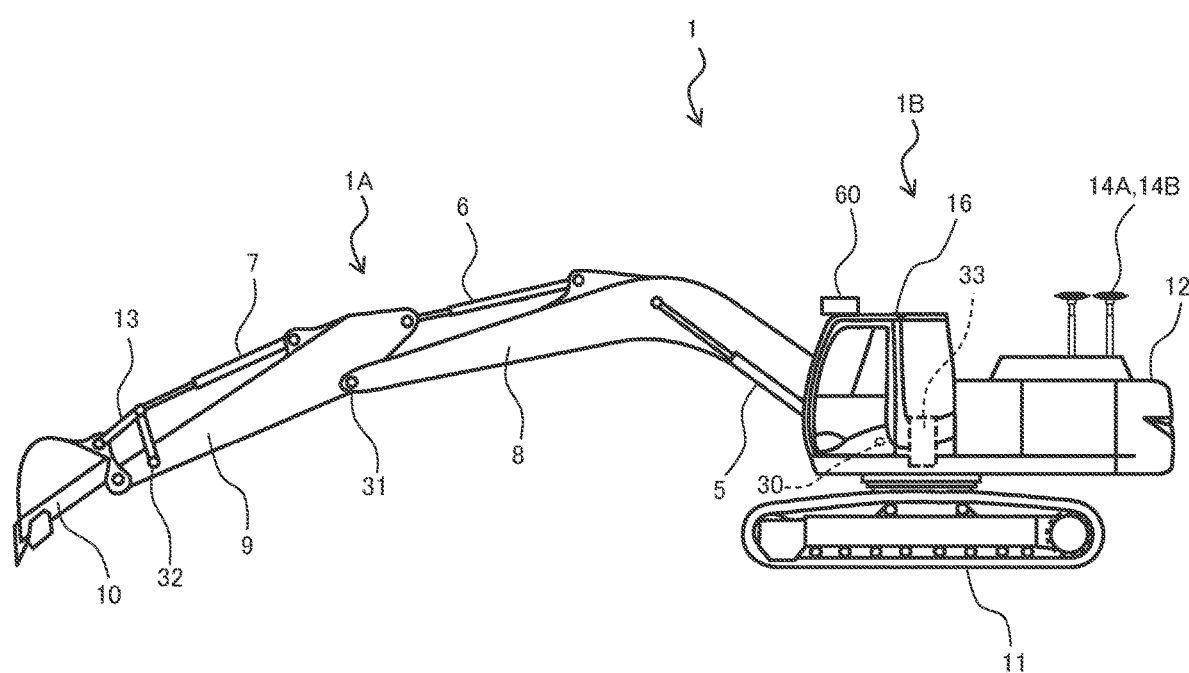
FIG. 1 is a configuration diagram of a hydraulic excavator.
Figure 2:
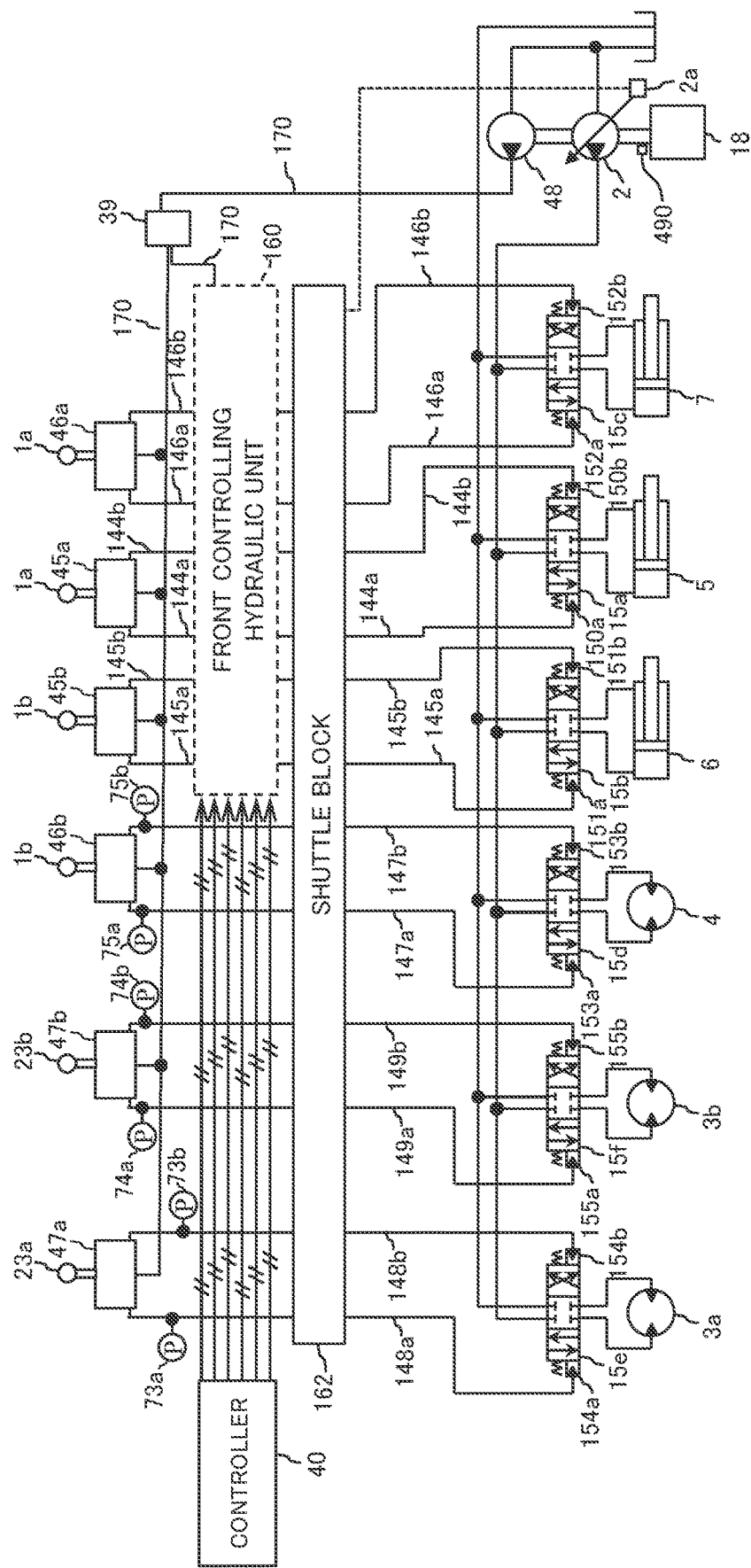
FIG. 2 is a diagram illustrating a controller for the hydraulic excavator along with a hydraulic drive system.
Figure 3:
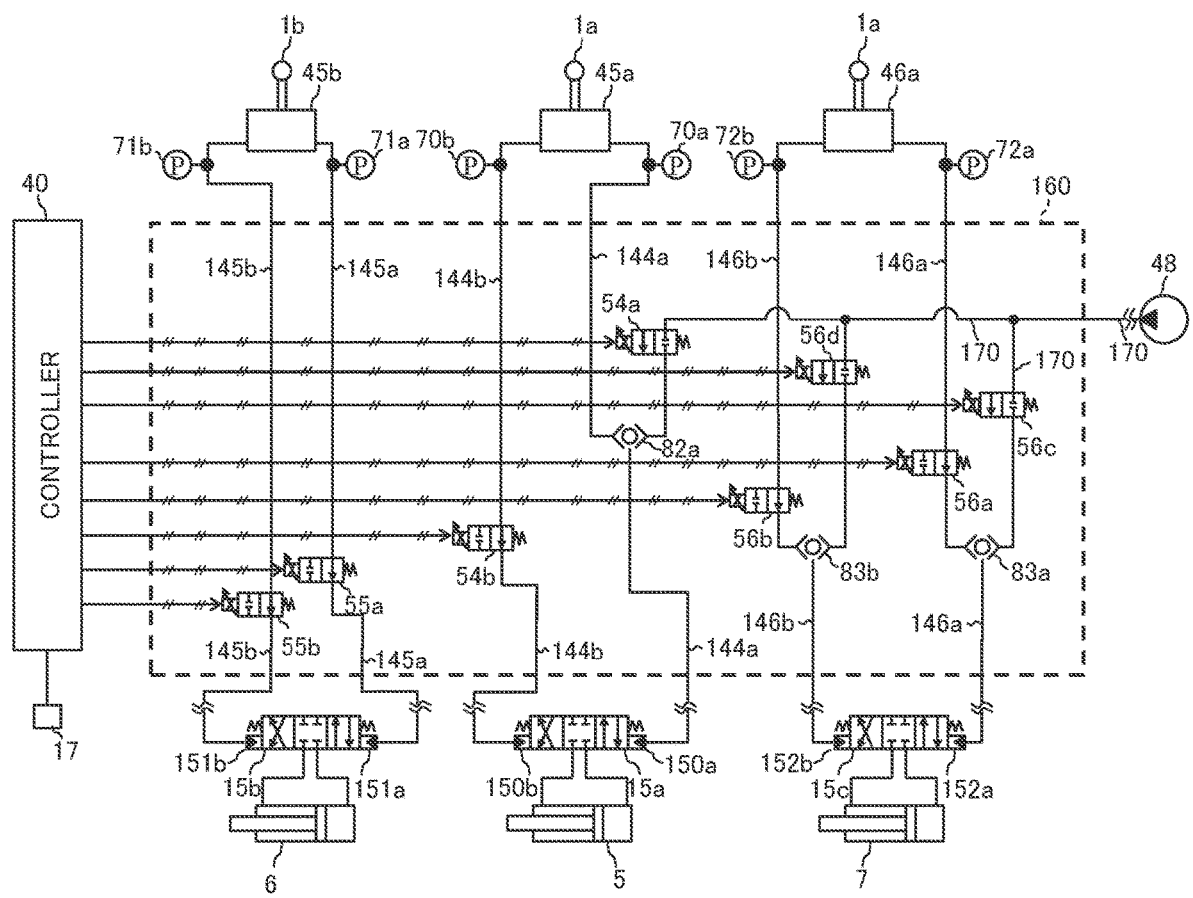
FIG. 3 is a detailed diagram of a front controlling hydraulic unit 160 in FIG. 2.

FIG. 1 is a configuration diagram of a hydraulic excavator according to embodiments of the present invention. FIG. 2 is a diagram illustrating a controller for the hydraulic excavator according to the embodiments of the present invention, along with a hydraulic drive system. FIG. 3 is a detailed diagram of a front controlling hydraulic unit 160 in FIG. 2 and a peripheral facility for the front controlling hydraulic unit 160.

In FIG. 1, a hydraulic excavator 1 includes an articulated front work device 1A and a machine body 1B. The machine body 1B includes a lower travel structure 11 driven by left and right travelling hydraulic motors 3a and 3b (for the hydraulic motor 3a, see FIG. 2) and an upper swing structure 12 mounted on the lower travel structure 11 and swung by a swinging hydraulic motor 4.

The front work device 1A includes a plurality of driven members (a boom 8, an arm 9, and a bucket 10) coupled together and each rotating in a vertical direction. A base end of the boom 8 is rotatably supported via a boom pin at a front portion of the upper swing structure 12. The arm 9 is rotatably coupled to a tip of the boom 8 via an arm pin, and the bucket 10 is rotatably coupled to a tip of the arm 9 via a bucket pin. The boom 8 is driven by a boom cylinder 5, the arm 9 is driven by an arm cylinder 6, and the bucket 10 is driven by a bucket cylinder 7.

To enable measurement of rotation angles $\alpha$, $\beta$, and $\gamma$ (see FIG. 4) of the boom 8, the arm 9, and the bucket 10, a boom angle sensor 30 is attached to the boom pin, an arm angle sensor 31 is attached to the arm pin, and a bucket angle sensor 32 is attached to a bucket link 13. A machine body inclination angle sensor 33 is attached to the upper swing structure 12 to detect an inclination angle $\theta$ (see FIG. 5) of the upper swing structure 12 (machine body 1B) with respect to a reference surface (for example, a horizontal surface). Note that the angle sensors 30, 31, and 32 can be replaced with angle sensors with respect to the reference surface.

An operation device 47a (FIG. 2), an operation device 47b (FIG. 2), operation devices 45a and 46a (FIG. 2), and operation devices 45b and 46b (FIG. 2) are installed in a cab provided in the upper swing structure 12. The operation device 47a includes a travelling right lever 23a (FIG. 2) and is used to operate a travelling right hydraulic motor 3a (lower travel structure 11), the operation device 47b includes a travelling left lever 23b (FIG. 2) and is used to operate a travelling left hydraulic motor 3b (lower travel structure 11), the operation devices 45a and 46a share an operation right lever 1a (FIG. 2) and are used to operate the boom cylinder 5 (boom 8) and the bucket cylinder 7 (bucket 10), and the operation devices 45b and 46b share an operation left lever 1b (FIG. 2) and are used to operate the arm cylinder 6 (arm 9) and the swinging hydraulic motor 4 (upper swing structure 12). In the following, the travelling right lever 23a, the travelling left lever 23b, the operation right lever 1a, and the operation left lever 1b may be collectively referred to as the operation levers 1 and 23.

An engine 18 corresponding to a prime mover mounted in the upper swing structure 12 drives a hydraulic pump 2 and a pilot pump 48. The hydraulic pump 2 is a variable displacement pump having a capacity controlled by a regulator 2a, and the pilot pump 48 is a fixed displacement pump. In the present embodiment, as illustrated in FIG. 2, a shuttle block 162 is provided in the middle of pilot lines 144, 145, 146, 147, 148, and 149. Hydraulic signals output from the operation devices 45, 46, and 47 are also input to the regulator 2a via the shuttle block 162. While a detailed configuration of the shuttle block 162 is omitted, the hydraulic signals are input to the regulator 2a via the shuttle block 162 to control a delivery flow rate of the hydraulic pump 2 according to the hydraulic signals.

A pump line 170 used as a delivery line of the pilot pump 48 extends through a lock valve 39 and then branches into a plurality of lines connected to respective valves in the operation devices 45, 46, and 47 and the front controlling hydraulic unit 160. The lock valve 39 is, in the present example, a solenoid selector valve, and includes a solenoid drive section electrically connected to a position sensor of a gate lock lever (not illustrated) disposed in the cab of the upper swing structure 12. The position of the gate lock lever is detected by the position sensor, and the position sensor inputs, to the lock valve 39, a signal corresponding to the position of the gate lock lever. In a case where the gate lock lever is in a lock position, the lock valve 39 is closed to close the pump line 170, and in a case where the gate lock lever is in an unlock position, the lock valve 39 is opened to open the pump line 170. In other words, with the pump line 170 closed, operation by the operation devices, 45, 46, and 47 is invalidated, prohibiting such operation as swinging or excavating.

The operation devices 45, 46, and 47 are each of a hydraulic pilot type, and generate a pilot pressure (sometimes referred to as an operation pressure) on the basis of pressurized fluid delivered from the pilot pump 48, according to an operation amount (for example, lever stroke) and an operation direction of one of the operation levers 1 and 23 operated by the operator. The pilot pressure thus generated is fed, via a corresponding one of pilot lines 144a to 149b (see FIG. 3), to one of hydraulic drive sections 150a to 155b in a corresponding one of flow rate control valves 15a to 15f (see FIG. 2 or FIG. 3) in a control valve unit 20, and is used as a control signal for driving a corresponding one of the flow rate control valves 15a to 15f.

The pressurized fluid delivered from the hydraulic pump 2 is fed to the travelling right hydraulic motor 3a, the travelling left hydraulic motor 3b, the swinging hydraulic motor 4, the boom cylinder 5, the arm cylinder 6, or the bucket cylinder 7 via the flow rate control valve 15a, 15b, 15c, 15d, 15e, or 15f (see FIG. 3). The fed pressurized fluid extends and contracts the boom cylinder 5, the arm cylinder 6, or the bucket cylinder 7 to pivot the boom 8, the arm 9, or the bucket 10, respectively, changing the position and posture of the bucket 10. Additionally, the fed pressurized fluid rotates the swinging hydraulic motor 4 to swing the upper swing structure 12 with respect to the lower travel structure 11. Then, the fed pressurized fluid rotates the travelling right hydraulic motor 3a and the travelling left hydraulic motor 3b to cause the lower travel structure 11 to travel.

Figure 4:
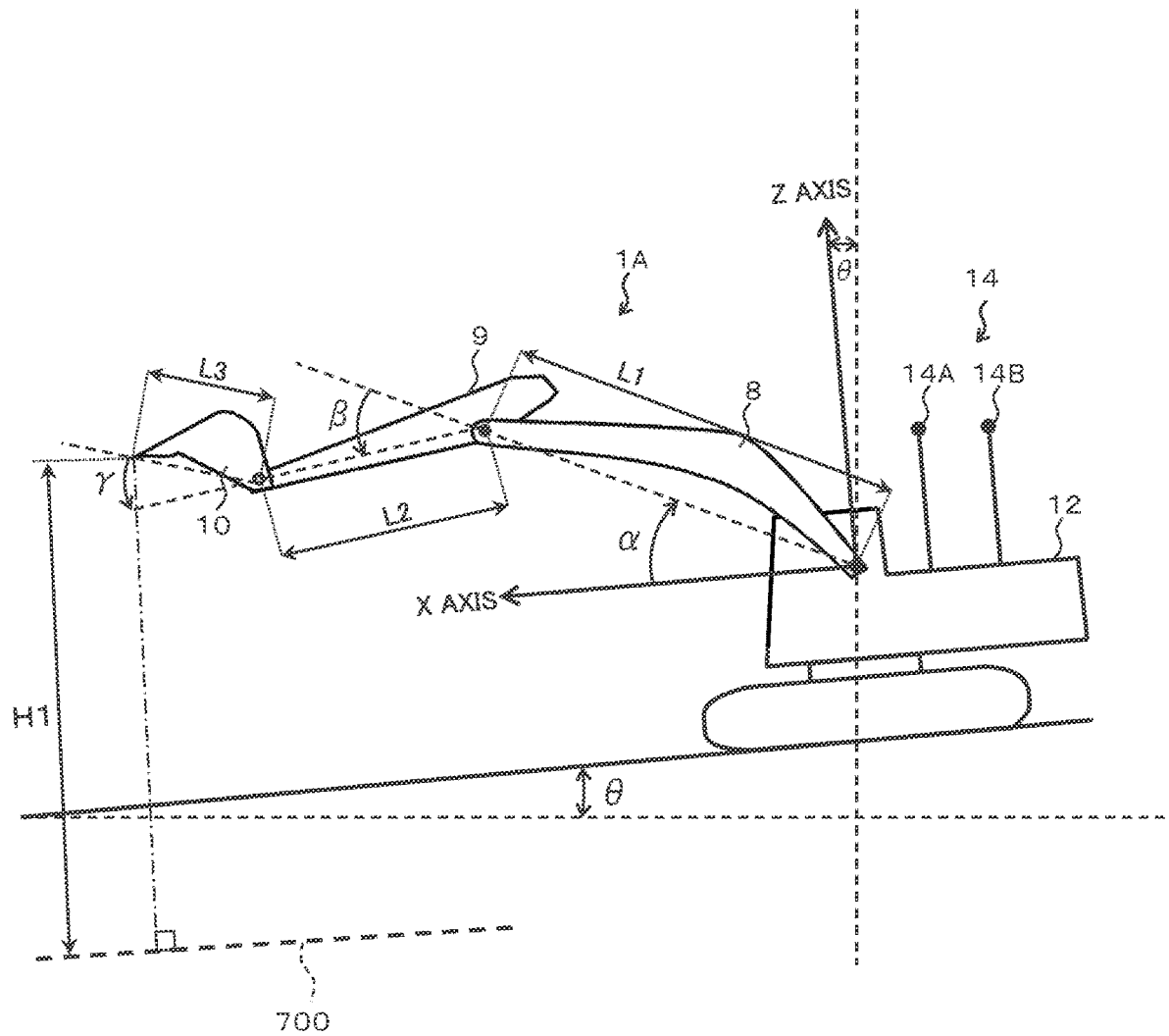
FIG. 4 is a diagram illustrating a coordinate system and a target surface for the hydraulic excavator in FIG. 1.

The posture of the work machine 1A can be defined on the basis of excavator reference coordinates in FIG. 4. The excavator reference coordinates in FIG. 4 are coordinates set for the upper swing structure 12. An origin of the coordinates corresponds to a base portion of the boom 8, and a Z axis of the coordinates is set in a vertical direction in the upper swing structure 12, and an X axis of the coordinates is set in a horizontal direction in the upper swing structure 12. The inclination angle of the boom 8 with respect to the X axis is designated as a boom angle $\alpha$, the inclination angle of the arm 9 with respect to the boom is designated as an arm angle $\beta$, and the inclination angle of a claw tip of the bucket with respect to the arm is designated as a bucket angle $\gamma$. The inclination angle of the machine body 1B (upper swing structure 12) with respect to a horizontal surface (reference surface) is designated as an inclination angle $\theta$. The boom angle $\alpha$ is detected by the boom angle sensor 30, the arm angle $\beta$ is detected by the arm angle sensor 31, the bucket angle $\gamma$ is detected by the bucket angle sensor 32, and an inclination angle $\theta$ is detected by the machine body inclination angle sensor 33. The boom angle $\alpha$ is minimized when the boom 8 is raised to the maximum point (highest point) (when the boom cylinder 5 is at a stroke end in a raising direction, in other words, when a boom cylinder length is maximized), and is maximized when the boom 8 is lowered to the minimum point (lowest point) (when the boom cylinder 5 is at a stroke end in a lowering direction, in other words, when the boom cylinder length is minimized). The arm angle $\beta$ is minimized when the arm cylinder length is minimized, and is maximized when the arm cylinder length is maximized. The bucket angle γ is minimized when the bucket cylinder length is minimized (as illustrated in FIG. 4), and is maximized when the bucket cylinder length is maximized. At this time, assuming that L1 denotes a length from the base portion of the boom 8 to a connection portion between the boom 8 and the arm 9, that L2 denotes a length from the connection portion between the arm 9 and the boom 8 to a connection portion between the arm 9 and the bucket 10, and that L3 denotes a length from the connection portion between the arm 9 and the bucket 10 to a tip portion of the bucket 10, a tip position of the bucket 10 can be expressed in accordance with Equations (1) and (2) on the assumption that $X_{bk}$ denotes an X direction position and that $Z_{bk}$ denotes a Z direction position.

$$X_{bk}=L_1 \cos(\alpha)+L_2 \cos(\alpha+\beta)+L_3 \cos(\alpha+\beta+\gamma) \quad \text{Equation (1)}$$

$$Z_{bk}=L1 \sin(\alpha)+L2 \sin(\alpha+\beta)+L3 \sin(\alpha+\beta+\gamma) \quad \text{Equation (2)}$$

Additionally, as illustrated in FIG. 4, the hydraulic excavator 1 includes a pair of GNSS (Global Navigation Satellite System) antennas 14A and 14B on the upper swing structure 12. On the basis of information from the GNSS antennas 14, the position of the hydraulic excavator 1 or the position of the bucket 10 in a global coordinate system can be computed.

Figure 5:
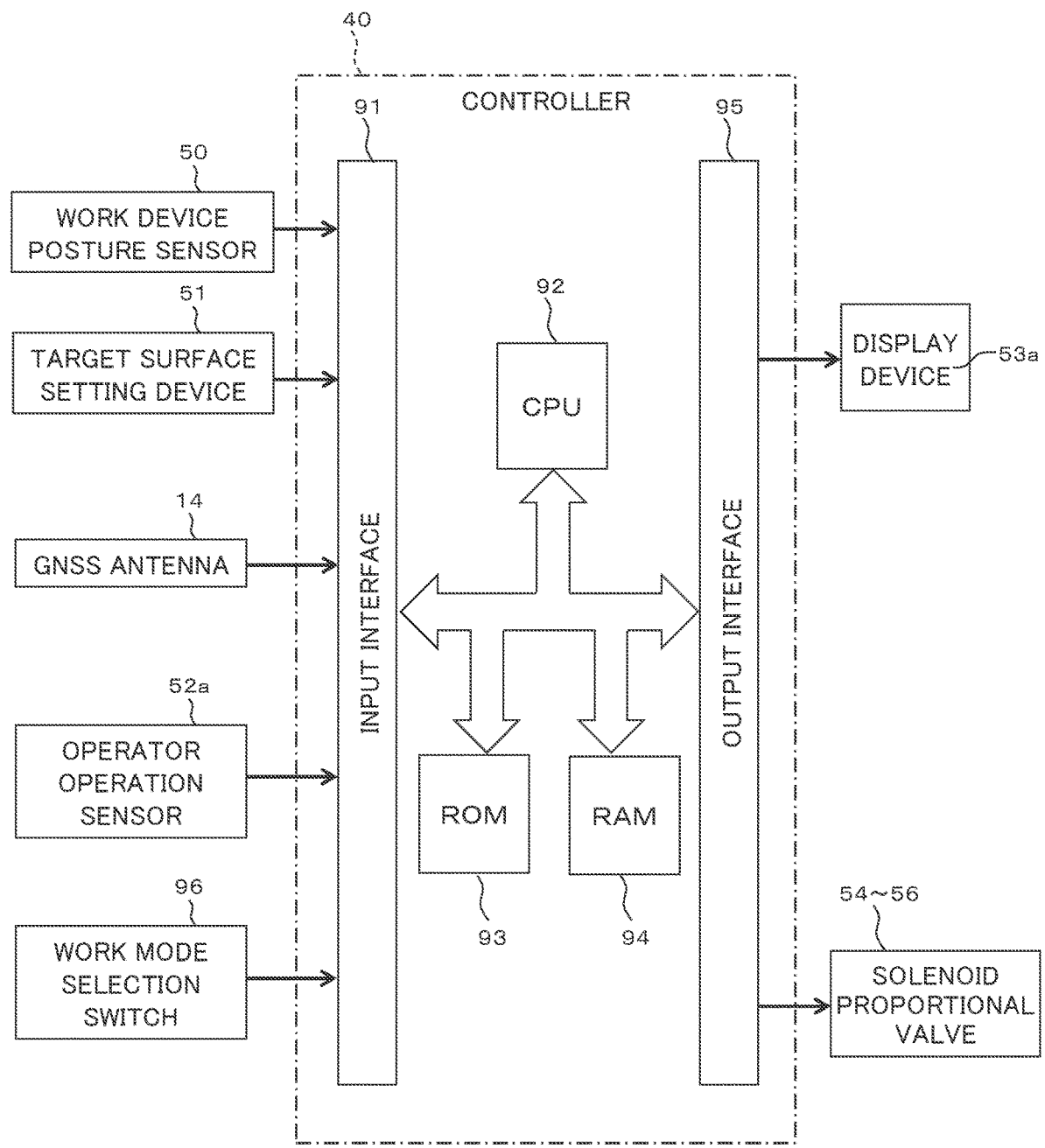
FIG. 5 is a hardware configuration diagram of a controller 40 for the hydraulic excavator.

FIG. 5 is a configuration diagram of a Machine Guidance (MG) system and a Machine Control (MC) system included in the hydraulic excavator according to the present embodiment.

In the present system, operation of at least one of the operation devices 45a, 45b, and 46a executes MC for operating the front work device 1A in accordance with predefined conditions. Control of the hydraulic actuators 5, 6, and 7 in MC is executed by forcibly outputting control signals (for extending the boom cylinder 5 to cause a boom raising operation to be performed forcibly, for example) to the corresponding flow rate control valves 15a, 15b, and 15c. The MC executed by the present system includes "levelling control (area limitation control)" executed when an arm operation is performed using the operation device 45b, "stopping control" executed when a boom lowering operation is performed without execution of the arm operation, and "compaction control" also executed when the boom lowering operation is performed without execution of the arm operation.

The levelling control (area limitation control) is MC in which at least one of the hydraulic actuators 5, 6, and 7 is controlled to position the front work device 1A on a predetermined target surface 700 (see FIG. 4) or above the target surface 700. To move the bucket tip portion along the target surface 700 by the arm operation, a boom raising operation velocity or a boom lowering operation velocity is output to zero a velocity vector of the bucket claw tip (tip of the work device 1A) in a direction perpendicular to the target surface 700.

The stopping control is MC in which the boom lowering operation is stopped to prevent the bucket tip portion (for example, the bucket claw tip) from moving to a position below the target surface 700 and in which the boom lowering operation velocity is gradually reduced as a distance between the target surface 700 and the bucket tip portion decreases.

The compaction control is MC in which a reduction in boom lowering operation velocity is minimized even with a short distance between the target surface 700 and the bucket 10, thus allowing achievement of compaction work in which an excavated surface formed to conform to the target surface 700 is compacted by vigorously pushing a bottom surface of the bucket 10 against the target surface 700.

Note that, in the present embodiment, a control point of the front work device 1A during MC is set at the claw tips of the bucket 10 (tip of the work device 1A) of the hydraulic excavator, but the control point may be changed to a point other than the bucket claw tip as long as the point belongs to the tip portion of the work device 1A. For example, a bottom surface of the bucket 10 or an outermost portion of the bucket link 13 can be selected, or a configuration in which a point on the bucket 10 that is closest from the target surface 700 is appropriately set as a control point may be employed. Additionally, herein, the MC is sometimes referred to as "semi-automatic control" in which the operation of the work device 1A is controlled by the controller only when the operation device 45 or 46 is operated, compared to "automatic control" in which the operation of the work device 1A is controlled by the controller while the operation devices 45 and 46 are not operated.

Figure 6:
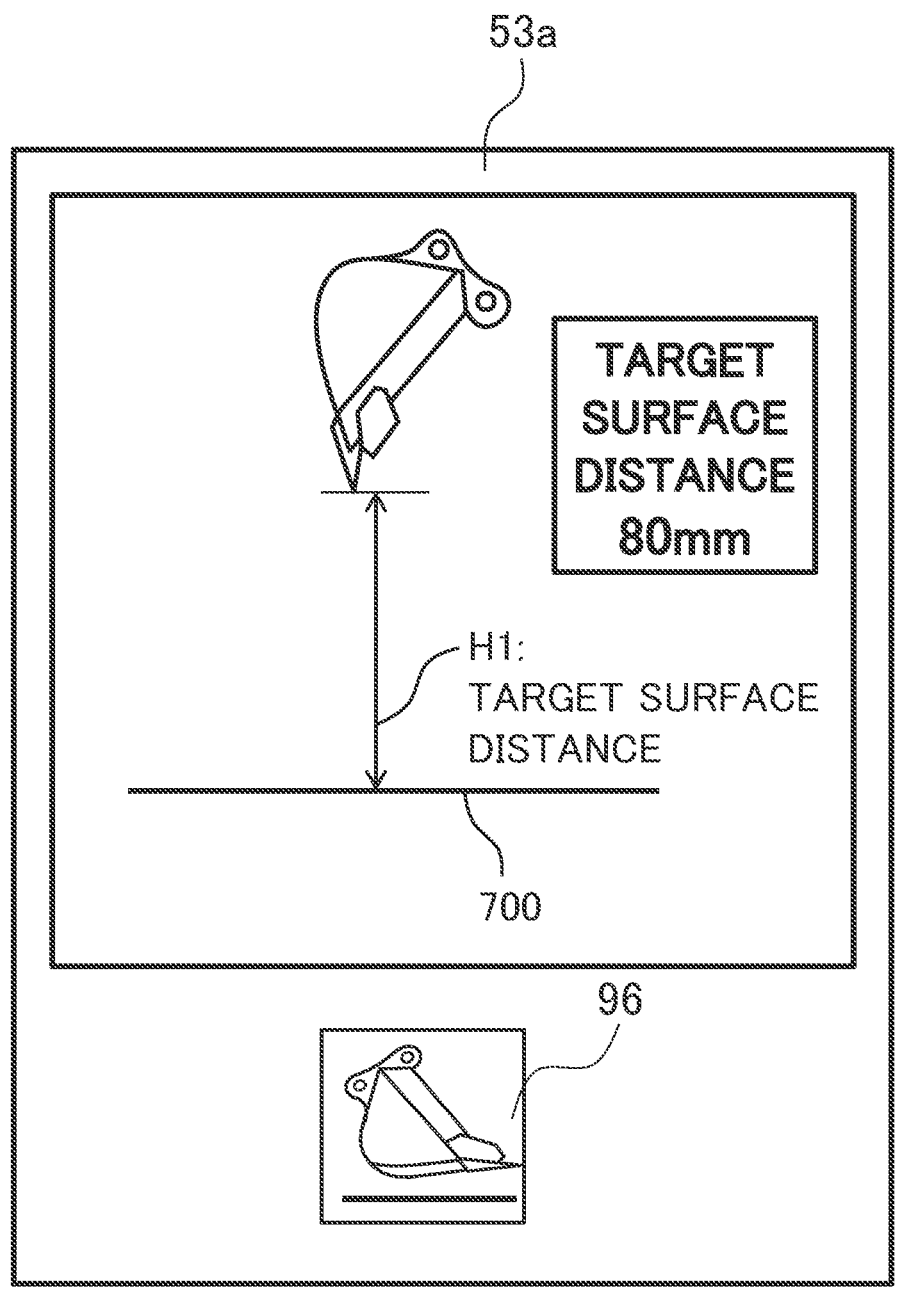

Additionally, MG of the front work device 1A in the present system includes displaying a positional relationship between the target surface 700 and the work device 1A (for example, the bucket 10) on the display device 53a, for example, as illustrated in FIG. 6.

The system in FIG. 5 includes a work device posture sensor 50, a target surface setting device 51, a GNSS antenna 14, an operator operation sensor 52a, the display device 53a, a work mode selection switch 96, the controller 40 serving to perform the MG and MC, and the display device 53a.

The work device posture sensor 50 includes the boom angle sensor 30, the arm angle sensor 31, the bucket angle sensor 32, and the machine body inclination angle sensor 33. The angle sensors 30, 31, 32, and 33 function as posture sensors for the work device 1A.

The target surface setting device 51 is an interface to which information regarding the target surface 700 (including position information and inclination angle information regarding each target surface) can be input. The target surface setting device 51 is connected to an external terminal (not illustrated) storing three-dimensional data regarding the target surface defined on the global coordinate system (absolute coordinate system). Note that the operator may manually input the target surface via the target surface setting device 51.

The operator operation sensor 52a includes pressure sensors 70a, 70b, 71a, 71b, 72a, and 72b that acquire operation pressures (first control signals) generated in pilot lines 144, 145, and 146 through operation of the operation levers 1a and 1b (operation devices 45a, 45b, and 46a) by the operator. Specifically, the operator operation sensor 52a detects operation on the hydraulic cylinders 5, 6, and 7 related to the work device 1A.

The display device 53a is a touch panel type liquid crystal monitor used to display a positional relationship between the target surface 700 and the work device 1A (for example, the bucket 10) as illustrated in FIG. 6, and is installed in the cab. As illustrated in FIG. 6, a display screen of the display device 53a displays a positional relationship between the target surface 700 and the bucket 10 and displays a distance from the target surface 700 to the claw tip of the bucket 10 as a target surface distance.

Figure 7:
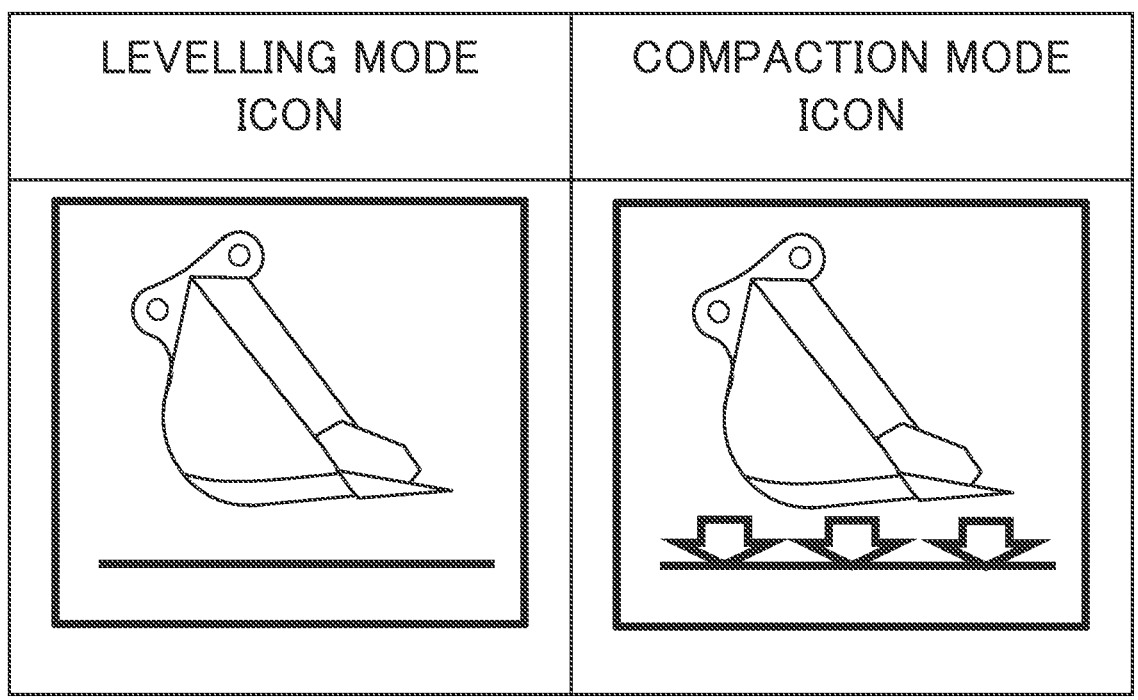
FIG. 7 is a diagram illustrating an example of an icon for a work selectin mode.

The work mode selection switch 96 is a switch used to select one of a levelling mode (first mode) and a compaction mode (second mode) as a work mode to be implemented by the work device 1A. The work mode selection switch 96 according to the present embodiment includes an icon displayed on the screen of the display device 53a. FIG. 7 illustrates an icon for the levelling mode and an icon for the compaction mode. The currently selected mode is displayed on the screen as an icon, and the operator can touch the icon on the screen to allow the work mode (that is, a switching position of the switch) to be switched.

—Front Controlling Hydraulic Unit 160—

As illustrated in FIG. 3, the front controlling hydraulic unit 160 includes the pressure sensors 70a and 70b provided in pilot lines 144a and 144b of the operation device 45a for the boom 8 and detecting the pilot pressure (first control signal) as the operation amount of the operation lever 1a, a solenoid proportional valve 54a connected at a primary port side to the pilot pump 48 via the pump line 170 and reducing the pilot pressure from the pilot pump 48 and outputting the reduced pilot pressure, a shuttle valve 82a connected to the pilot line 144a of the operation device 45a for the boom 8 and to a secondary port side of the solenoid proportional valve 54a and selecting a higher pressure between the pilot pressure in the pilot line 144a and a control pressure (second control signal) output from the solenoid proportional valve 54a and guiding the selected pressure to the hydraulic drive section 150a for the flow rate control valve 15a, and a solenoid proportional valve 54b installed in the pilot line 144b of the operation device 45a for the boom 8 and reducing the pilot pressure (first control signal) in the pilot line 144b on the basis of a control signal from the controller 40 and outputting the reduced pilot pressure.

Additionally, the front controlling hydraulic unit 160 includes the pressure sensors 71a and 71b installed in pilot lines 145a and 145b for the arm 9 and detecting the pilot pressure (first control signal) as the operation amount of the operation lever 1b and outputting the detected pilot pressure to the controller 40, a solenoid proportional valve 55b installed in the pilot line 145b and reducing the pilot pressure (first control signal) on the basis of a control signal from the controller 40 and outputting the reduced pilot pressure, and a solenoid proportional valve 55a installed in the pilot line 145a and reducing the pilot pressure (first control signal) in the pilot line 145a on the basis of a control signal from the controller 40 and outputting the reduced pilot pressure.

Additionally, in the front controlling hydraulic unit 160, pilot lines 146a and 146b for the bucket 10 are provided with the pressure sensors 72a and 72b detecting the pilot pressure (first control signal) as the operation amount of the operation lever 1a and outputting the detected pilot pressure to the controller 40, solenoid proportional valves 56a and 56b reducing the pilot pressure (first control signal) on the basis of a control signal from the controller 40 and outputting the reduced pilot pressure, solenoid proportional valves 56c and 56d connected at a primary port side to the pilot pump 48 and reducing the pilot pressure from the pilot pump 48 and outputting the reduced pilot pressure, and shuttle valves 83a and 83b respectively selecting a higher pressure between the pilot pressure in the pilot lines 146a and 146b and the control pressure output from the solenoid proportional valves 56c and 56d and guiding the selected pressure to the hydraulic drive sections 152a and 152b for the flow rate control valve 15c. Note that, in FIG. 3, connection lines between the pressure sensors 70, 71, and 72 and the controller 40 are omitted for convenience of the drawing.

The solenoid proportional valves 54b, 55a, 55b, 56a, and 56b have a maximum opening during no conduction and the opening of each of the solenoid proportional valves decreases with an increase in current used as a control signal from the controller 40. On the other hand, the solenoid proportional valves 54a, 56c, and 56d have no opening during no conduction and have a certain opening during conduction, and the opening of each of the solenoid proportional valves increases as current (control signal) from the controller 40 increases. In this manner, the openings 54, 55, and 56 of the solenoid proportional valves correspond to the control signal from the controller 40.

In the controlling hydraulic unit 160 configured as described above, in a case where the controller 40 outputs a control signal to and drives any of the solenoid proportional valves 54a, 56c, and 56d, the pilot pressure (second control signal) can be generated even in a case where no operator operation is performed on the corresponding operation device 45a or 46a. Thus, the boom raising operation, a bucket crowding operation, or a bucket dumping operation can forcibly be generated. Additionally, similarly, in a case where the controller 40 drives any of the solenoid proportional valves 54b, 55a, 55b, 56a, and 56b, the pilot pressure (second control signal) can be generated by reducing the pilot pressure (first control signal) generated by the operator operation of the corresponding one of the operation devices 45a, 45b, and 46a. The velocity of boom lowering operation, an arm crowding/dumping operation, or the bucket crowding/dumping operation can forcibly be reduced from the value of the operator operation.

Herein, among the control signals provided to the flow rate control valves 15a to 15c, the pilot pressure generated by operating the operation devices 45a, 45b, and 46a is referred to as the "first control signal". In addition, among the control signals provided to the flow rate control valves 15a to 15c, the following are referred to as the "second control signal": the pilot pressure generated by driving, by the controller 40, the solenoid proportional valve 54b, 55a, 55b, 56a, or 56b to correct (reduce) the first control signal, and the pilot pressure generated by driving, by the controller 40, the solenoid proportional valve 54a, 56c, or 56d to newly generate a pilot pressure separately from the first control signal.

The second control signal is generated when the velocity of the control point of the work device 1A generated by the first control signal contradicts a predetermined condition, and is generated as a control signal generating a velocity of the control point of the work device 1A which velocity does not contradict the predetermined condition. Note that, in a case where the first control signal is generated for one of the hydraulic drive sections for each of the flow rate control valves 15a to 15c and the second control signal is generated for the other hydraulic drive section for the same flow rate control valve, the second control signal is intended to preferentially act on the hydraulic drive section, and the first control signal is closed off by the solenoid proportional valve, with the second control signal input to the other hydraulic drive section. Accordingly, those of the flow rate control valves 15a to 15c for which the second control signal is calculated are controlled on the basis of the second control signal, and those of the flow rate control valves 15a to 15c for which the second control signal is not calculated are controlled on the basis of the first control signal. Those of the flow rate control valves 15a to 15c for which neither of the first and second control signals is generated are not controlled (driven). In a case where the first control signal and the second control signal are defined as described above, the MC can also be described as control of the flow rate control valves 15a to 15c based on the second control signal.

—Controller—

In FIG. 5, the controller 40 includes an input interface 91, a central processing unit (CPU) 92 corresponding to a processor, a read only memory (ROM) 93 and a random access memory (RAM) 94 corresponding to storage devices, and an output interface 95. The input interface 91 receives signals from the angle sensors 30 to 32 and the inclination angle sensor 33 that are included in the work device posture sensor 50, a signal from the target surface setting device 51, which is a device setting the target surface 700, a signal from the GNSS antenna 14, signals from the pressure sensors 70a, 70b, 71a, 71b, 72a, and 72b included in the operator operation sensor 52a, and a signal from the work mode selection switch 96, and converts the signals into signals that can be calculated by the CPU 92. The ROM 93 is a recording medium in which, for example, a control program for executing the MC and MG including processing described below and various types of information necessary to execute the processing are recorded. The CPU 92 executes, according to the control program stored in the ROM 93, predetermined calculation processing on signals retrieved from the input interface 91 and the ROM 93 and RAM 94. The output interface 95 generates a signal for output according to a calculation result from the CPU 92, and outputs the signal to a communication device 53, which is thus activated.

Note that the controller 40 in FIG. 5 includes, as storage devices, the ROM 93 and the RAM 94 corresponding to semiconductor memories, but that the ROM 93 and the RAM 94 can particularly be replaced with any storage devices and that the controller 40 may include a magnetic storage device, for example, a hard disk drive.

Figure 8:
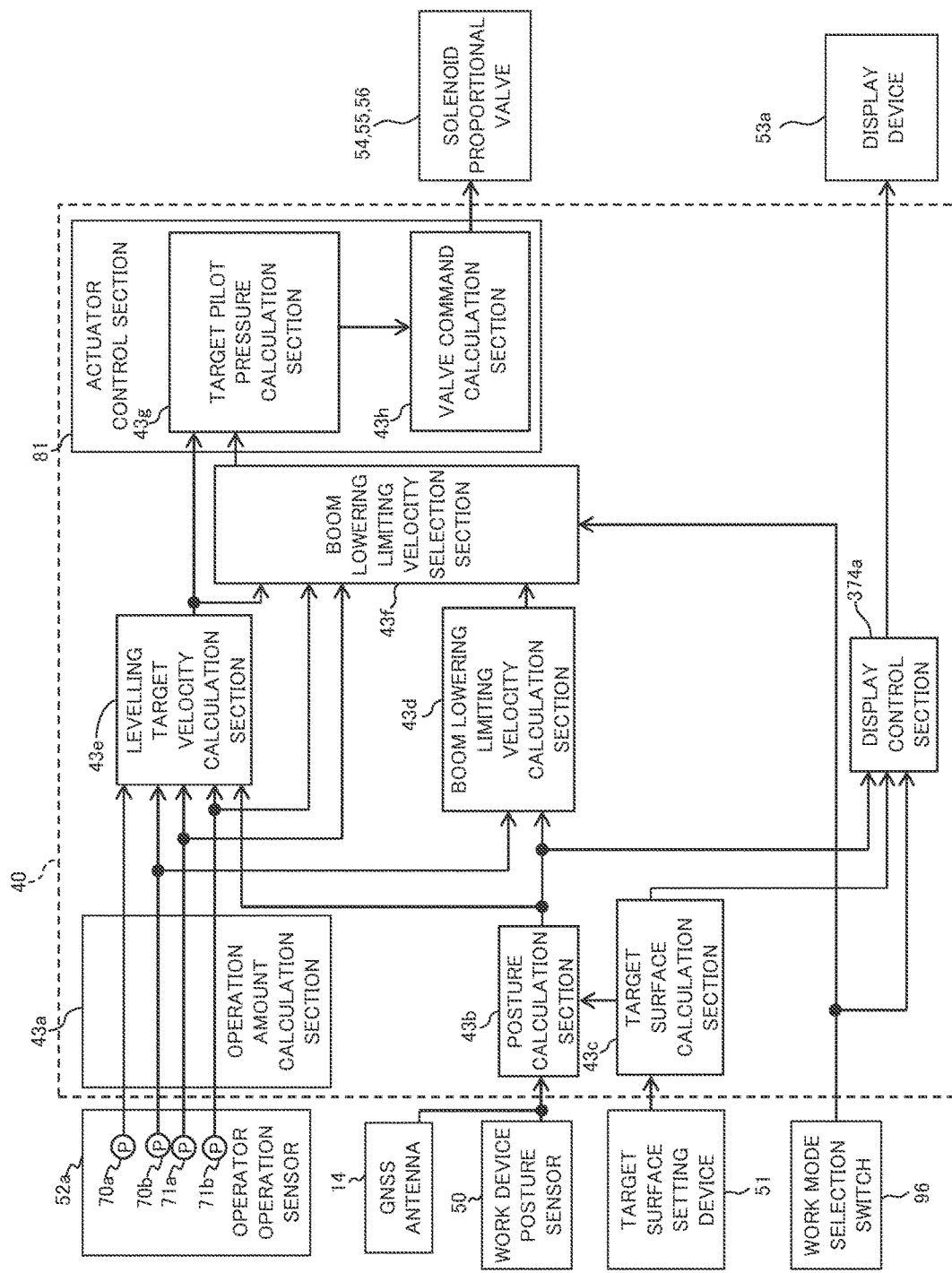
FIG. 8 is a functional block diagram of the controller 40 for the hydraulic excavator.

FIG. 8 is a functional block diagram of the controller 40. The controller 40 functions as an operation amount calculation section 43a, a posture calculation section 43b, a target surface calculation section 43c, a levelling target velocity calculation section 43e, a boom lowering limiting velocity calculation section 43d, a boom lowering limiting velocity selection section 43f, a target pilot pressure calculation section 43g, a valve command calculation section 43h, and a display control section 374a. Note that the target pilot pressure calculation section 43g and the valve command calculation section 43h may collectively be referred to as an actuator control section 81 below.

The operation amount calculation section 43a computes the operation amounts of the operation devices 45a, 45b, and 46a (operation levers 1a and 1b) on the basis of an input from the operator operation sensor 52a. The operation amounts of the operation devices 45a, 45b, and 46a can be computed from detection values from the pressure sensors 70, 71, and 72. The operation amount of boom raising is computed from a detection value from the illustrated pressure sensor 70a, the operation amount of boom lowering is computed from a detection value from the pressure sensor 70b, the operation amount of arm crowding (arm pulling) is computed from a detection value from the pressure sensor 71a, and the operation amount of arm dumping (arm pushing) is computed from a detection value from the pressure sensor 71b. The operation amounts into which the detection values from the pressure sensors 70, 71, and 72 are converted as described above are output to the levelling target velocity calculation section 43e, the boom lowering limiting velocity calculation section 43d, or the boom lowering limiting velocity selection section 43f. Note that the operation amount calculation section 43a also calculates the operation amount of bucket dumping/crowding from the detection value from the pressure sensor 72 and the calculation result is output to the levelling target velocity calculation section 43e.

Note that the computation of the operation amounts by the pressure sensors 70, 71, and 72 is only illustrative and, for example, position sensors (for example, rotary encoders) detecting rotation displacement of the operation levers of the operation devices 45a, 45b, and 46a may detect the operation amounts of the operation levers. Alternatively, instead of the configuration of computing an operation velocity from the operation amount, a configuration in which stroke sensors detecting extension and contraction amounts of the hydraulic cylinders 5, 6, and 7 are attached to the cylinders 5, 6, and 7 and in which the operation velocity of each cylinder is computed on the basis of detected temporal changes in extension and contraction amount can be employed.

On the basis of information from the work device posture sensor 50, the posture calculation section 43b calculates the posture of the front work device 1A in a local coordinate system (excavator reference coordinates) and the position of the claw tip of the bucket 10. As described above, the claw tip position (Xbk, Zbk) of the bucket 10 can be calculated in accordance with Equation (1) and Equation (2). Additionally, in a case where the posture of the front work device 1A in the global coordinate system and the position of the claw tip of the bucket 10 are necessary, the posture calculation section 43b computes, from a signal from the GNSS antenna 14, the position and posture of the upper swing structure 12 in the global coordinate system to convert the local coordinate system into the global coordinate system.

The target surface calculation section 43c calculates position information regarding the target surface 700 on the basis of information from the target surface setting device 51, and stores the position information in the RAM 94. In the present embodiment, as illustrated in FIG. 4, a cross-sectional shape resulting from cutting of a three-dimensional target surface by a plane through which the work device 1A moves (an operation plane of the work device) is used as the target surface 700 (two-dimensional target surface).

Note that the example in FIG. 4 involves the single target surface 700 but a plurality of target surfaces may be present. Possible methods available in a case where a plurality of target surfaces are present include, for example, setting, as the target surface, one of the surfaces closest to the work device 1A, setting, as the target surface, a surface positioned below the bucket claw tip, and setting an optionally selected surface as the target surface.

The levelling target velocity calculation section 43e calculates target velocities for the hydraulic cylinders 5, 6, and 7 during levelling control (area limiting control). The levelling target velocity calculation section 43e receives the operation amounts of the operation device 45a, 45b, and 46a from the operation amount calculation section 43a and figures the target velocities for the hydraulic cylinders 5, 6, and 7. Furthermore, the levelling target velocity calculation section 43e determines a target velocity vector Vc (see FIG. 9) of the bucket tip from the target velocities for the hydraulic cylinders 5, 6, and 7, the tip position (claw tip position) of the bucket determined by the posture calculation section 43b, and the dimensions of components of the work device 1A stored in the ROM 93 such as L1, L2, and L3 described above. Control (direction conversion control) is executed as follows: the target velocity for any necessary hydraulic cylinder of the hydraulic cylinders 5, 6, and 7 is corrected such that a component Vcy of the target velocity vector Vc (see FIG. 9) of the bucket tip which component is perpendicular to the target surface 700 is zeroed as a distance (target surface distance) H1 between the bucket tip and the target surface 700 approaches zero, thus converting the velocity vector of the bucket tip into Vca (see FIG. 9). The velocity vector Vca obtained when the target surface distance H1 is zero includes only a component Vcx parallel to the target surface 700. Thus, the claw tip (control point) of the bucket 10 is held to lie on or above the target surface 700.

At this time, in a case where software is designed such that the direction conversion control is based on a combination of boom raising/lowering and arm crowding, when the velocity vector Vc includes a component in a direction in which the vector approaches the target surface 700 (that is, when the vector component Vcy in the direction perpendicular to the target surface 700 is negative), the levelling target velocity calculation section 43e calculates a target velocity for the boom cylinder 5 in a boom raising direction that negates the component. In contrast, when the velocity vector Vc includes a component in a direction in which the vector leaves the target surface 700 (that is, when the vector component Vcy in the direction perpendicular to the target surface 700 is positive), the levelling target velocity calculation section 43e calculates a target velocity for the boom cylinder 5 in a boom lowering direction that negates the component.

Furthermore, in a case where the software is designed such that the direction conversion control is based on a combination of boom raising/lowering and arm dumping, when the velocity vector Vc includes a component in a direction in which the vector approaches the target surface 700, the levelling target velocity calculation section 43e calculates a target velocity for the boom cylinder 5 in a boom raising direction that negates the component. In contrast, when the velocity vector Vc includes a component in a direction in which the vector leaves the target surface 700, the levelling target velocity calculation section 43e calculates a target velocity for the boom cylinder 5 in a boom lowering direction that negates the component.

In a case where the levelling target velocity calculation section 9c calculates the target velocity for the boom cylinder 5 in the boom lowering direction, the target velocity is output to the boom lowering limiting velocity selection section 43f, while the other target velocities are output to the target pilot pressure calculation section 43g.

Note that, with no levelling control executed, the hydraulic cylinder target velocities based on the operation amounts of the operation devices (target velocities for the hydraulic cylinders based on the operation amounts of operations by the operator) are output from the levelling target velocity calculation section 43e.

The boom lowering limiting velocity calculation section 43d calculates a first boom lowering velocity and a second boom lowering velocity on the basis of the target surface distance H1 and a detection value from the pressure sensor 70b indicating the boom lowering operation amount.

—First Boom Lowering Velocity—

Figure 10:
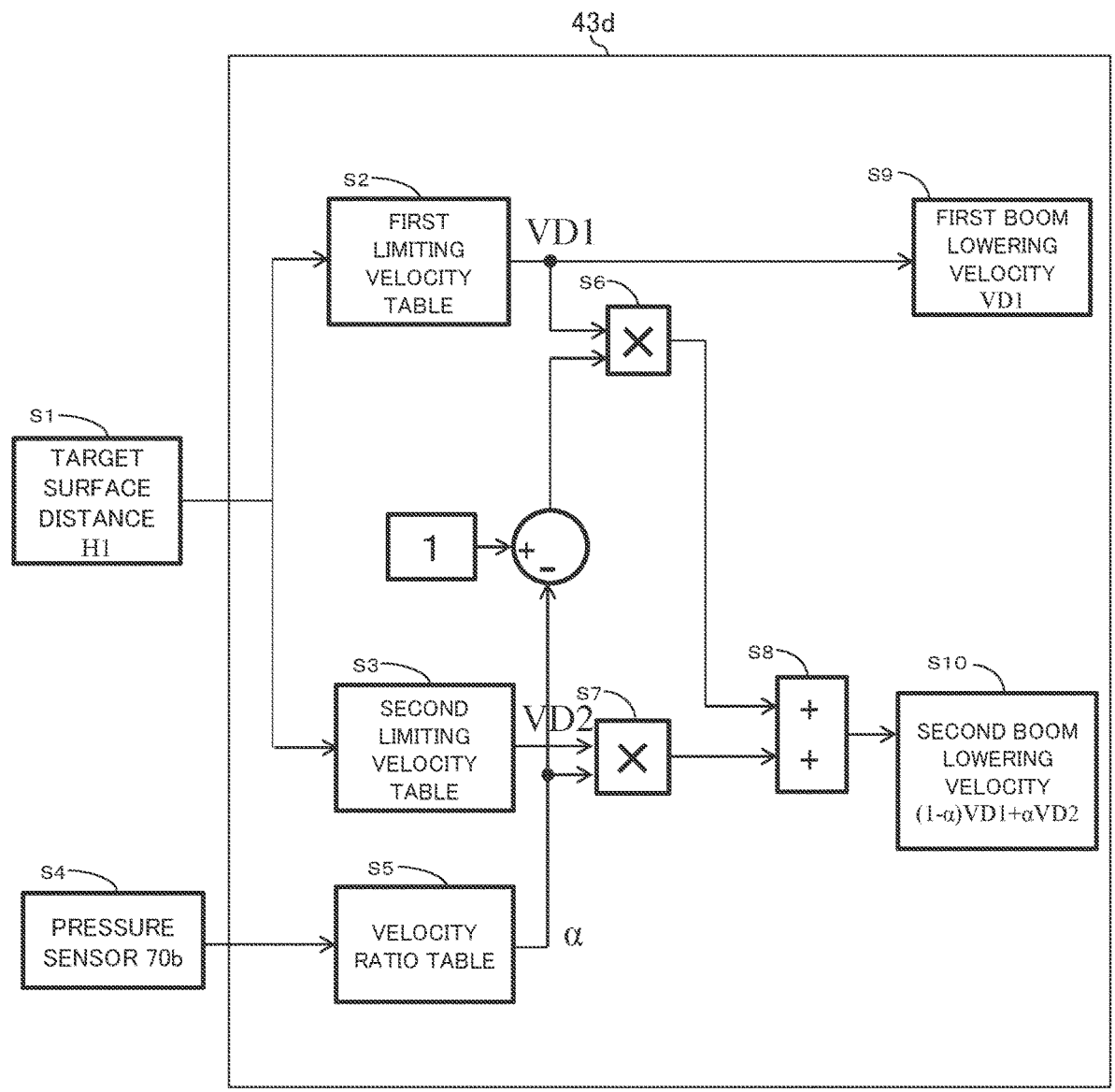
FIG. 10 is a control block diagram of a boom lowering limiting velocity calculation section 43d.
Figure 11:
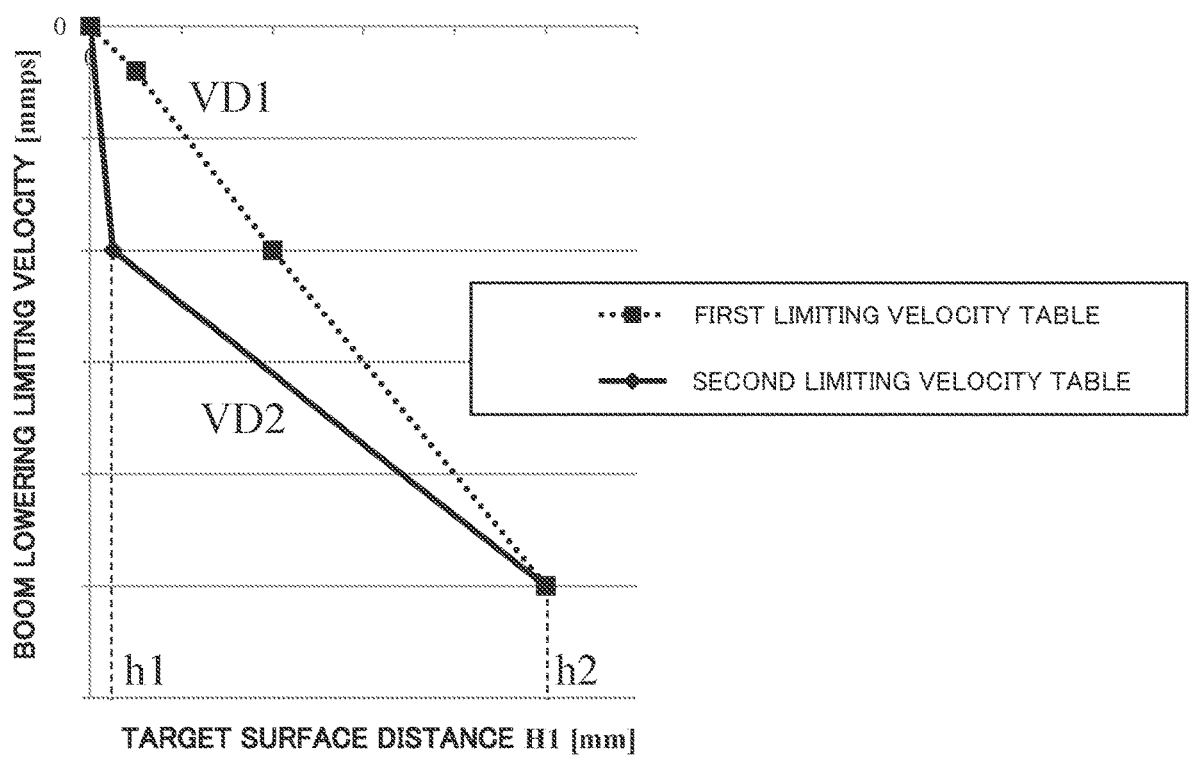
FIG. 11 is a diagram illustrating an example of a first velocity limitation table and a second velocity limitation table used by the boom lowering limiting velocity calculation section 43d.

FIG. 10 is a control block diagram of the boom lowering limiting velocity calculation section 43d. First, the first boom lowering velocity will be described. The boom lowering limiting velocity calculation section 43d inputs, to a first limiting velocity table S2 represented by a dashed line in FIG. 11, the target surface distance H1 (S1) from the bucket tip to the target surface 700 which distance is calculated by the posture calculation section 43b, and outputs (calculates) a first limiting velocity VD1 (stopping boom lowering velocity (first velocity)) in the lowering direction of the boom cylinder 5 (S9), as the first boom lowering velocity. The first limiting velocity table in FIG. 11 is set such that the limiting velocity for the boom cylinder 5 gradually decreases according to the decrease in the target surface distance H1 to make the limiting velocity in the lowering direction of the boom cylinder 5 closer to zero as the target surface distance H1 decreases to stop the bucket tip on the target surface 700. In the example in FIG. 11, the limiting velocity for the boom cylinder 5 decreases consistently with the decrease in the target surface distance H1 according to a linear function.

—Second Boom Lowering Velocity—

Next, the second boom lowering velocity will be described. The boom lowering limiting velocity calculation section 43d inputs the target surface distance H1 calculated by the posture calculation section 43b (S1), to a second velocity limitation table S3 illustrated in FIG. 11, and outputs (calculates) a second limiting velocity VD2 (compaction boom lowering velocity (third velocity)) (S3). For the target surface distance H1, a value close to 0 is set as h1 (first distance) and a value larger than h1 is designated as h2 (second distance) (in other words, 0<h1<h2). Then, in the second velocity limitation table in FIG. 11, the second limiting velocity is set higher than the first limiting velocity while the target surface distance H1 is within a range from zero to the set value h2, in which the machine control is executed. However, the second limiting velocity is set such that, for compaction of the target surface 700, the slope of velocity of the boom cylinder 5 in the lowering direction with respect to the target surface distance H1 is steep (that is, the limiting velocity decreases rapidly) beyond the set value h1.

Figure 12:
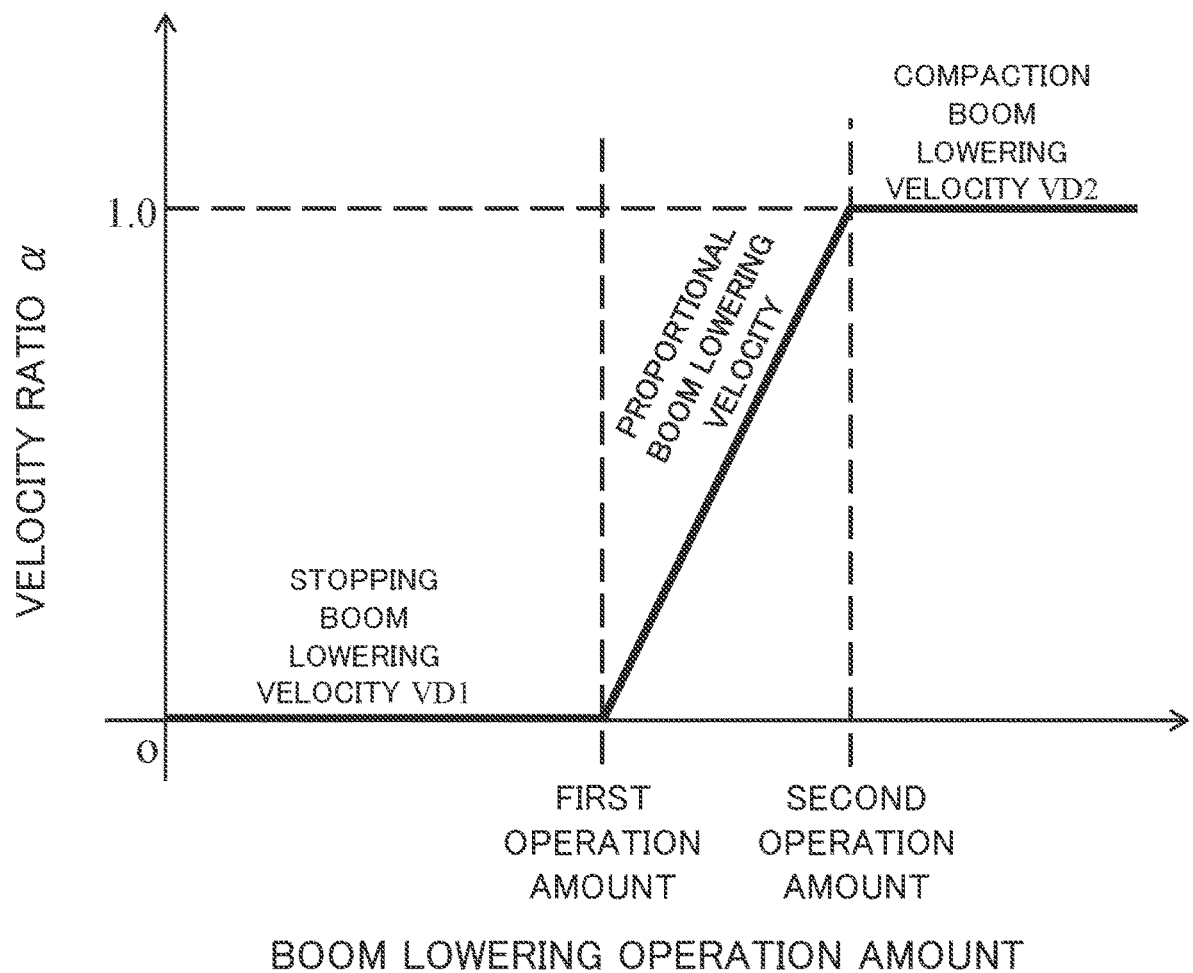
FIG. 12 is a diagram illustrating an example of a velocity ratio table used by the boom lowering limiting velocity calculation section 43d.

Additionally, the pilot pressure detected by the pressure sensor 70b, in other words, the value of the boom lowering operation amount (S4), is input to a velocity ratio table (S5) illustrated in FIG. 12, and a velocity ratio $\alpha$ ($\alpha=f(x)$) used as a function for the boom lowering operation amount (x) is calculated. Here, for the boom lowering operation amount, a first operation amount larger than zero and a second operation amount larger than the first operation amount are set. Then, in a case where the operation amount of boom lowering is smaller than the first operation amount, the function a outputs 0.0. In a case where the operation amount of boom lowering is equal to or larger than the first operation amount but smaller than the second operation amount, the function a outputs a numerical value (maximum value: 1.0) increasing monotonically with an increase in a deviation between the boom lowering operation amount and the first operation amount. In a case where the operation amount of boom lowering is equal to or larger than the second operation amount, the function a outputs 1.0. Note that, for the function a, a function other than the function illustrated in FIG. 11 can be used as long as the function is a monotonically increasing function monotonically increasing from zero toward one within the range from the first operation amount to the second operation amount.

Here, another function $(1-\alpha)$ is further defined. In a case where the operation amount of boom lowering is equal to or larger than the first operation amount but smaller than the second operation amount, the function $(1-\alpha)$ decreases monotonically with increasing deviation between the boom lowering operation amount and the first operation amount. Herein, the function $(1-\alpha)$ may be referred to as a first function, and the function a may be referred to as a second function.

As the second boom lowering velocity (second velocity), a sum $((1-\alpha)VD1+\alpha VD2)$ that is obtained by adding together a value resulting from multiplication of the first limiting velocity VD1 by the first function (1−α) (S6) and a value resulting from multiplication of the second limiting velocity VD2 by the second function a (S7) is output (S8 and S10). Specifically, the second boom lowering velocity (second velocity) is defined by the weighted average of the first limiting velocity VD1 and the second limiting velocity VD2 and is set such that an increase in boom lowering operation amount reduces the weight (1−α) for the first limiting velocity VD1, while increasing the weight (α) for the second limiting velocity VD2.

As the first boom lowering velocity, the stopping boom lowering limiting velocity VD1 is constantly output. On the other hand, as the second boom lowering velocity, the stopping boom lowering limiting velocity VD1 is output in a case where the boom lowering operation amount is smaller than the first operation amount. In a case where the boom lowering operation amount is equal to or larger than the first operation amount but smaller than the second operation amount, a boom lowering limiting velocity that increases in proportion to the increase in the boom lowering operation amount (proportional boom lowering velocity) is output. In a case where the boom lowering operation amount is equal to or larger than the second operation amount, the compaction boom lowering limiting velocity VD2 is output.

The work mode selection switch 96 outputs 1 as a levelling mode flag, to the boom lowering limiting velocity selection section 43f in a case where the levelling mode is selected as the work mode. In contrast, the work mode selection switch 96 outputs 0 as a levelling mode flag, to the boom lowering limiting velocity selection section 43f in a case where the compaction mode is selected as the work mode.

—Boom Lowering Limiting Velocity Selection Section 43f—

The boom lowering limiting velocity selection section 43f is a section executing processing for selecting the limiting velocity for the boom cylinder 5 in the boom lowering direction to be output to the target pilot pressure calculation section 43g, on the basis of at least one of the presence or absence of an arm operation, the switching position of the work mode selection switch 96, and the boom lowering operation amount.

Figure 13:
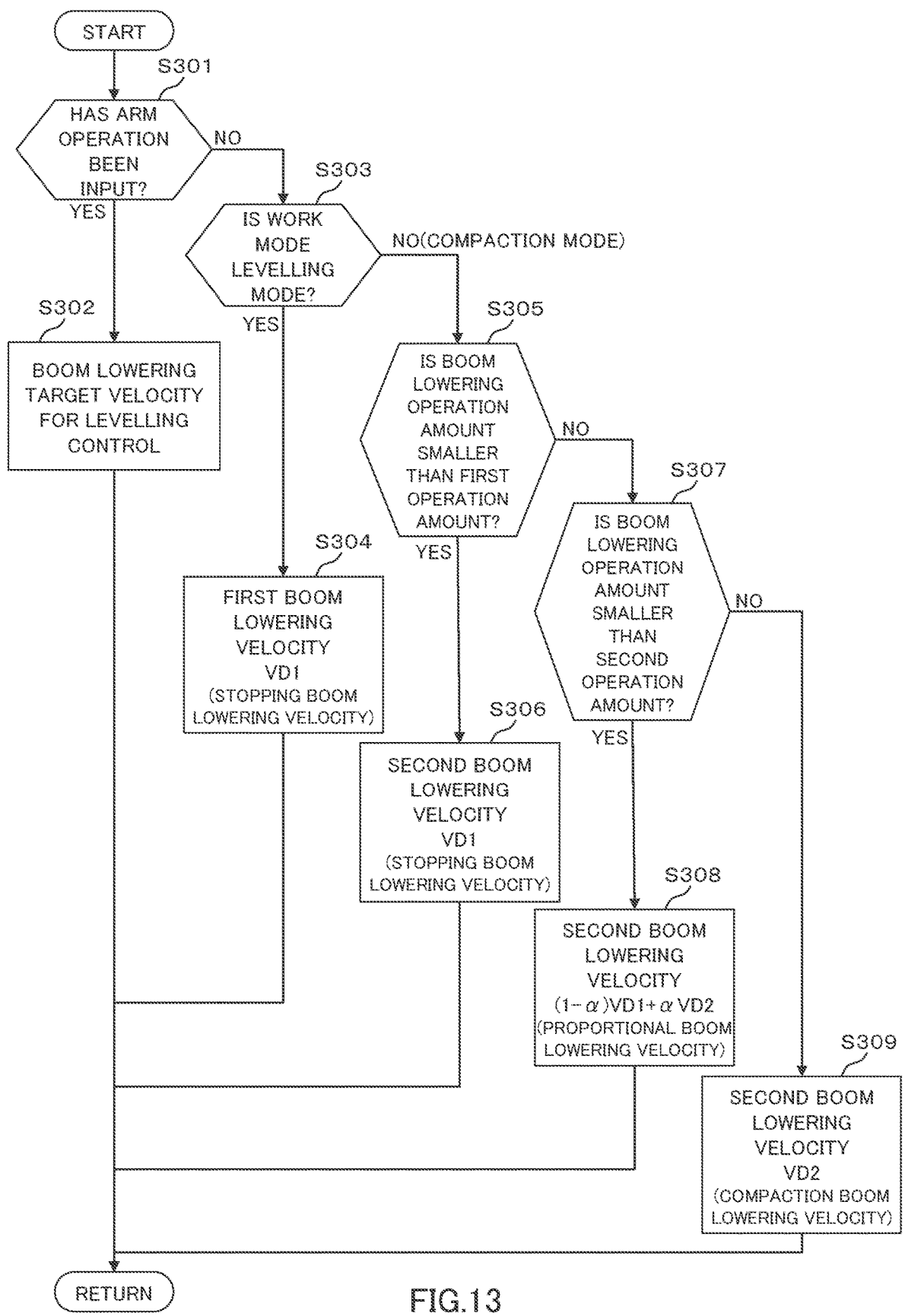
FIG. 13 is a flowchart of processing executed by a boom lowering limiting velocity selection section 43f according to a first embodiment.

FIG. 13 is a flowchart of processing executed by the boom lowering limiting velocity selection section 43f according to the present embodiment. The boom lowering limiting velocity selection section 43f executes in a repetitive manner the processing in FIG. 13 with a predetermined control period. When the processing is started, the boom lowering limiting velocity selection section 43f determines, in step S301, whether or not the arm operation has been input to the operation device 45b, on the basis of the arm operation amount input from the operation amount calculation section 43a. Here, the processing proceeds to step S302 when the boom lowering limiting velocity selection section 43f determines that the arm operation has been input, and proceeds to step S303 when the boom lowering limiting velocity selection section 43f determines that no arm operation has been input.

In step S302, the boom lowering limiting velocity selection section 43f outputs, to the target pilot pressure calculation section 43g, the target velocity for the boom cylinder in the lowering direction input from the levelling target velocity calculation section 43e. Note that, when the levelling target velocity calculation section 43e calculates the target velocity for the boom cylinder in the raising direction, the boom cylinder target velocity may be output to the target pilot pressure calculation section 43g without intervention of the boom lowering limiting velocity selection section 43f.

In step S303, the boom lowering limiting velocity selection section 43f determines whether the levelling mode has been selected as the work mode, on the basis of the levelling mode flag input from the work mode selection switch 96. Here, in a case where the levelling mode flag is 1, leading to the determination that the levelling mode has been selected, the processing proceeds to step S304. On the other hand, in a case where the levelling mode flag is 0, leading to the determination that the compaction mode has been selected, the processing proceeds to step S305.

In step S304, the boom lowering limiting velocity selection section 43f outputs, to the target pilot pressure calculation section 43g, the first boom lowering velocity VD1 calculated by the boom lowering limiting velocity calculation section 43d.

In step S305, the boom lowering limiting velocity selection section 43f determines whether or not the boom lowering operation input to the operation device 45a is smaller than the first operation amount, on the basis of the boom lowering operation amount input from the operation amount calculation section 43a. Here, in a case where the boom lowering limiting velocity selection section 43f determines that the boom lowering operation amount is smaller than the first operation amount, the processing proceeds to step S306. In a case where the boom lowering limiting velocity selection section 43f determines that the boom lowering operation amount is equal to or larger than the first operation amount, the processing proceeds to step S307.

In step S306, the boom lowering limiting velocity selection section 43f outputs, to the target pilot pressure calculation section 43g, the second boom lowering velocity (first velocity) calculated by the boom lowering limiting velocity calculation section 43d. In this case, the boom lowering operation amount is smaller than the first operation amount, and thus VD1 (stopping boom lowering velocity) is output as the second boom lowering velocity.

In step S307, the boom lowering limiting velocity selection section 43f determines whether or not the boom lowering operation input to the operation device 45a is smaller than the second operation amount, on the basis of the boom lowering operation amount input from the operation amount calculation section 43a. Here, in a case where the boom lowering limiting velocity selection section 43f determines that the boom lowering operation amount is smaller than the second operation amount, the processing proceeds to step S308. In a case where the boom lowering limiting velocity selection section 43f determines that the boom lowering operation amount is equal to or larger than the second operation amount, the processing proceeds to step S309.

In step S308, the boom lowering limiting velocity selection section 43f outputs, to the target pilot pressure calculation section 43g, the second boom lowering velocity (second velocity) calculated by the boom lowering limiting velocity calculation section 43d. In this case, the boom lowering operation amount is equal to or larger than the first operation amount but smaller than the second operation amount, and thus $(1-\alpha)VD1+\alpha VD2$ (proportional boom lowering velocity) is output as the second boom lowering velocity.

In step S309, the boom lowering limiting velocity selection section 43f outputs, to the target pilot pressure calculation section 43g, the second boom lowering velocity (third velocity) calculated by the boom lowering limiting velocity calculation section 43d. In this case, the boom lowering operation amount is equal to or larger than the second operation amount, and thus VD2 (compaction boom lowering velocity) is output as the second boom lowering velocity.

Specifically, regardless of the levelling mode flag output from the work mode selection switch 96, the boom lowering limiting velocity selection section 43f determines that levelling work corresponding to a combination of an arm operation and a boom operation is to be performed in a case where the pilot pressure for the arm operation detected by the pressure sensors 71a and 71b has been generated. The boom lowering limiting velocity selection section 43f then outputs, as the boom cylinder target velocity in the boom lowering direction, a levelling target cylinder velocity calculated by the levelling target velocity calculation section 9c. In a case where the pilot pressure detected by the pressure sensors 61a and 61b has not been generated and the levelling mode flag output from an excavation mode calculation section 9e is 1, the boom lowering limiting velocity selection section 43f determines that levelling is to be performed, and outputs, as a boom lowering cylinder velocity, the first boom lowering velocity calculated by a boom lowering limiting cylinder velocity calculation section 9d. In a case where the pilot pressure detected by the pressure sensors 61a and 61b has not been generated and the levelling mode flag output from the excavation mode calculation section 9e is 0, the boom lowering limiting velocity selection section 43f outputs, as a boom lowering cylinder velocity, the second boom lowering velocity calculated by the boom lowering limiting cylinder velocity calculation section 9d.

The target pilot pressure calculation section 43g calculates target pilot pressures to the flow rate control valves 15a, 15b, and 15c for the hydraulic cylinders 5, 6, and 7 on the basis of the target velocities for the cylinders 5, 6, and 7 computed by the levelling target velocity calculation section 43e. However, in calculating the target pilot pressures from the target velocities for the hydraulic cylinders, the target pilot pressure calculation section 43g determines, for boom lowering, whether or not the target velocity for the boom cylinder 5 computed by the levelling target velocity calculation section 43e exceeds the limiting velocity output from the boom lowering limiting velocity selection section 43f. Then, in determining that the target velocity for the boom cylinder 5 exceeds the limiting velocity, the target pilot pressure calculation section 43g limits the target velocity for the boom cylinder 5 to the limiting velocity output from the boom lowering limiting velocity selection section 43f. In this case, the target pilot pressure calculation section 43g calculates the target pilot pressure to the flow rate control valve 15a of the boom cylinder 5 on the basis of the limiting velocity output from the boom lowering limiting velocity selection section 43f. The target pilot pressure calculated by the target pilot pressure calculation section 43g is output to the valve command calculation section 43h.

The valve command calculation section 43h is a section calculating electric signals to be output to the solenoid proportional valves 54, 55, and 56 to exert, on the flow rate control valves 15a, 15b, and 15c of the hydraulic cylinders 5, 6, and 7, the target pilot pressures calculated by the target pilot pressure calculation section 43g, and outputting the calculated electric signals to the solenoid proportional valves 54, 55, and 56. The electric signals output from the valve command calculation section 43h control the solenoid proportional valves 54, 55, and 56 to exert the target pilot pressures on the flow rate control valves 15a, 15b, and 15c of the hydraulic cylinders 5, 6, and 7, thus causing the work device 1A to execute the work. For example, in a case where the operator operates the operation device 45b to perform horizontal excavation through an arm crowding operation, the solenoid proportional valve 55c is controlled to prevent the tip of the bucket 10 from moving to a position below the target surface 700, with a raising operation for the boom 8 and a velocity reduction operation for arm crowding automatically performed.

The display control section 374a executes processing for displaying, on the display device 53a, a positional relationship between the target surface 700 and the work device 1A (claw tip of the bucket 10) on the basis of the posture information regarding the front work device 1A, the position information regarding the claw tip of the bucket 10, and the position information regarding the target surface 700 that are input from the posture calculation section 43b.

Operations and Effects

Figure 9:
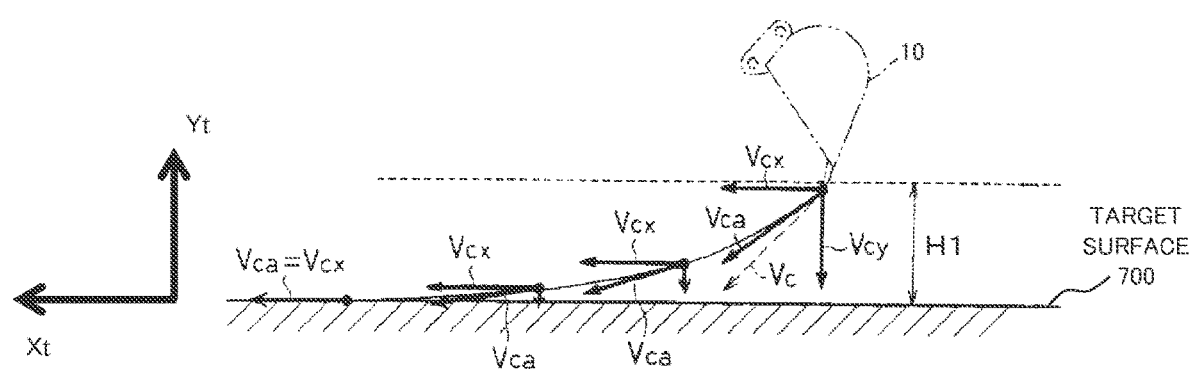
FIG. 9 is a diagram illustrating an example of a trajectory obtained when a tip of a bucket 10 is subjected to MC according to a corrected target velocity vector Vca.

According to the above-described configuration, in a case where the pilot pressures for the arm operation detected by the pressure sensors 71a and 71b have been generated, in other words, in a case where an operation instruction for the arm 9 has been provided (that is, in a case of step S302 in FIG. 13), the operations of the solenoid proportional valves 54a, 54b, 55a, and 55b according to the target velocities output by the levelling target velocity calculation section 43e controllably decelerate movement of the work device 1A in the direction perpendicular to the target surface 700, regardless of the work mode selected by the switch 96 or the level of the limiting velocity output from the boom lowering limiting velocity selection section 43f. However, in this case, a velocity component along the direction of the target surface 700 is not reduced, and the tip of the bucket 10 can be moved along the target surface 700 as illustrated in FIG. 9. Thus, excavation in which the area where the tip of the bucket 10 is movable is limited to the area on or above the target surface 700 can efficiently be performed.

Next, in a case where the pilot pressures for the arm operation detected by the pressure sensors 71a and 71b have not been generated, in other words, in a case where no arm operation has been performed, and the levelling mode has been selected as the work mode (that is, in a case of step S304 in FIG. 13), the boom lowering limiting velocity selection section 43f outputs, as the limiting velocity for the boom lowering cylinder velocity, the first boom lowering velocity (stopping boom lowering velocity VD1) calculated by the boom lowering limiting velocity calculation section 43d. Accordingly, selection of the levelling mode as the work mode prevents the compaction boom lowering limiting velocity from being output as the boom lowering velocity, thus avoiding a transition to the compaction control independent of the boom lowering operation amount. Specifically, even in a case where the boom lowering operation is inadvertently input, one of the levelling control and the stopping control is necessarily executed and execution of the compaction control is avoided. Thus, the operator can concentrate on formation of the target surface 700 based on the levelling control and the stopping control.

Next, in a case where no arm operation has been performed and the compaction mode has been selected as the excavation mode (that is, in a case where the processing proceeds to step S305 in FIG. 13), the following velocities are output according to the boom lowering operation amount. In a case where the boom lowering operation amount is smaller than the first operation amount (that is, in a case of step S306 in FIG. 13), the stopping boom lowering velocity VD1 is output. Thus, in a case where the boom lowering operation is performed, the boom lowering cylinder velocity gradually decreases as the bucket tip approaches the target surface 700 and reaches 0 when a target surface distance H1 is 0, as illustrated in FIG. 9, allowing the bucket tip to be stopped smoothly on the target surface 700.

On the other hand, in a case where the boom lowering operation amount is equal to or larger than the second operation amount (that is, in a case of step S309 in FIG. 13), the compaction boom lowering velocity VD2 is output. In this case, when the target surface distance H1 is reduced (when the target surface distance H1 is shorter than d1), the boom lowering cylinder velocity is rapidly reduced. However, the velocity vector does not become zero in a short period of time before the bucket tip reaches the target surface 700, thus allowing the target surface 700 to be compacted by the bottom surface of the bucket 10.

Additionally, in a case where the boom lowering operation amount is equal to or larger than the first operation amount but smaller than the second operation amount, a boom lowering limiting velocity that increases in proportion to the boom lowering operation amount within the range from the stopping boom lowering velocity VD1 (first velocity) to the compaction boom lowering limiting velocity VD2 (third velocity) (proportional boom lowering velocity: $(1-\alpha)$ VD1+$\alpha$VD2) is output. The boom lowering limiting velocity transitions smoothly according to the boom lowering operation amount within the range from the stopping boom lowering velocity VD1 to the compaction boom lowering velocity VD2, and thus possible shock caused by switching from the stopping boom lowering velocity VD1 to the compaction boom lowering velocity VD2 is prevented, and the operator is prevented from feeling uncomfortable with operation. Accordingly, the operator can perform the compaction work as intended.

Additionally, in a case where the boom lowering operation amount is equal to or larger than the second operation amount, the compaction boom lowering velocity VD2 is constantly output as the boom lowering cylinder limiting velocity. Thus, in a case where the boom lowering velocity is intended to be increased for work other than the compaction, for example, in a situation where an excavation force exerted solely by the boom lowering is intended to be increased, execution of a boom lowering operation with the second operation amount or larger makes the boom lowering limiting velocity higher than that in other cases, enabling an increase in excavation force exerted solely by the boom lowering operation.

Second Embodiment

Figure 14:
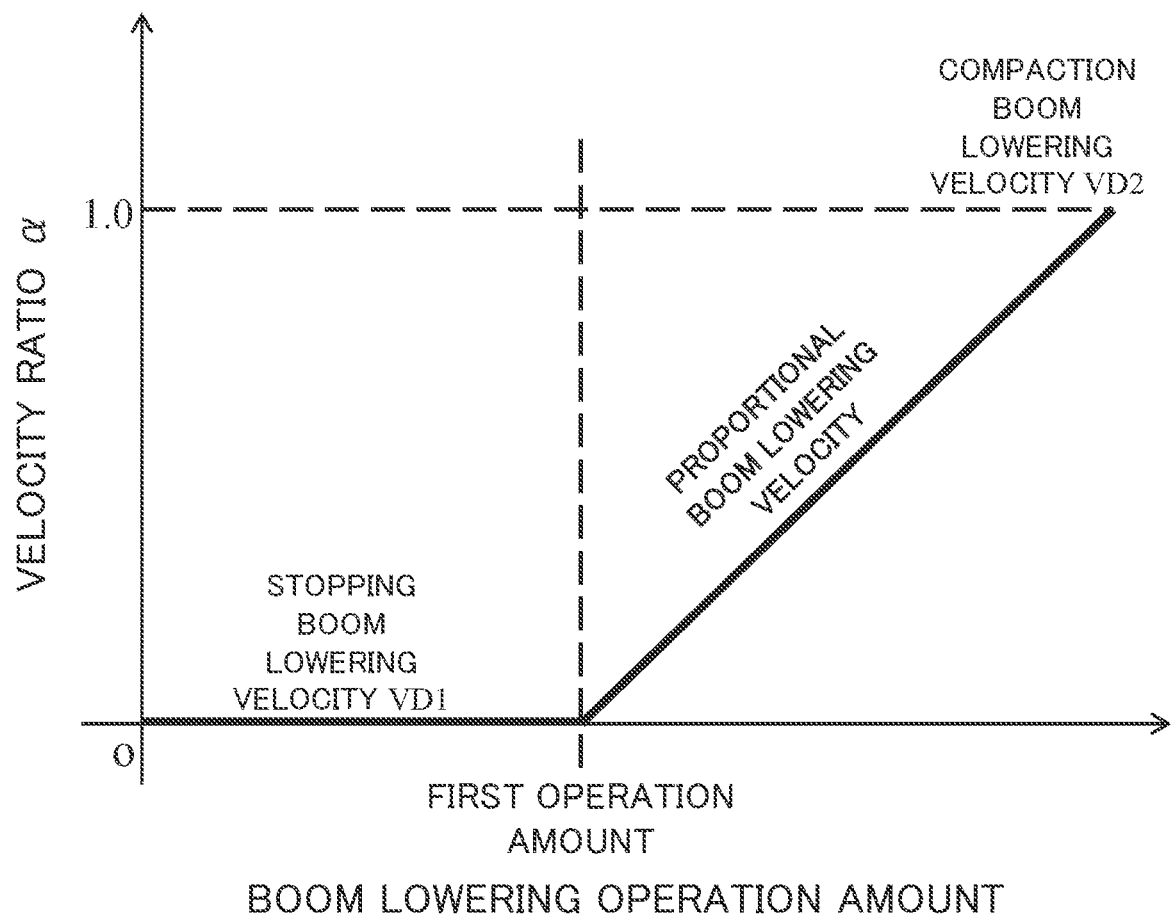
FIG. 14 is a velocity ratio table used by the boom lowering limiting velocity calculation section 43d according to a second embodiment.

The velocity ratio table according to the first embodiment (see FIG. 12) can be changed. FIG. 14 is a velocity ratio table according to a second embodiment. In the table in FIG. 14, the second operation amount is not set, and the velocity ratio $\alpha$ is set to reach 1.0 at the maximum boom lowering operation amount. Thus, in a case where the boom lowering operation amount is smaller than the first operation amount, the stopping boom lowering velocity is output. In a case where the boom lowering operation amount is equal to or larger than the first operation amount, a boom lowering limiting velocity is output that increases in proportion to the boom lowering operation amount within the range from the stopping boom lowering velocity VD1 to the compaction boom lowering velocity VD2 (proportional boom lowering velocity) is output. The velocity ratio table thus configured causes the boom lowering limiting velocity selection section 43f to execute processing as illustrated in FIG. 15.

Figure 15:
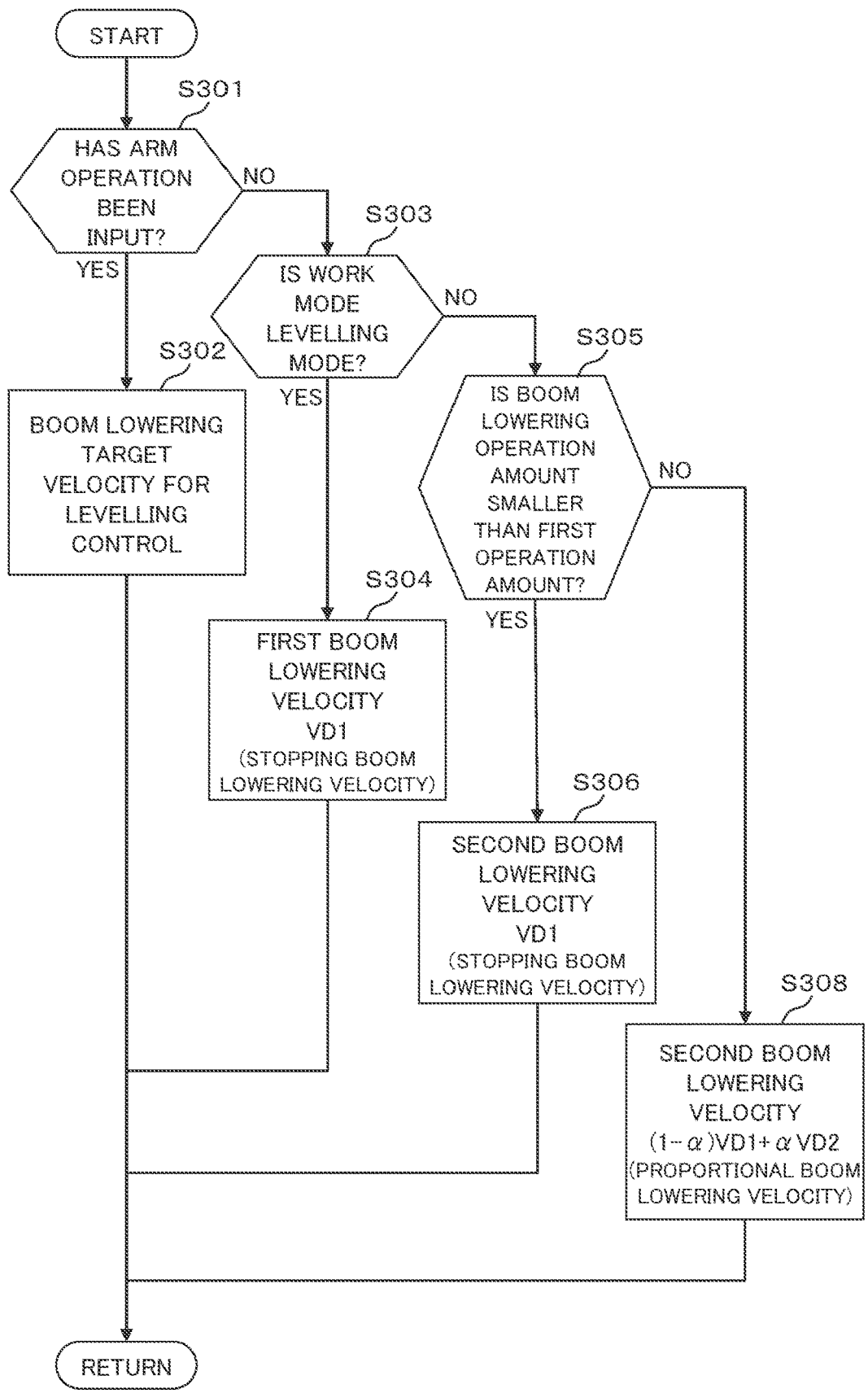
FIG. 15 is a flowchart of processing executed by the boom lowering limiting velocity selection section 43f according to the second embodiment.

FIG. 15 is a flowchart of the processing executed by the boom lowering limiting velocity selection section 43f. Portions of processing in FIG. 15 that are the same as the corresponding portions of the processing in FIG. 13 are assigned the same reference symbols and will not be described below. With the boom lowering limiting velocity selection section 43f configured as in FIG. 15, the compaction boom lowering velocity VD2 is not set unless the boom lowering operation amount is maximized. However, the boom lowering limiting velocity still transitions smoothly according to the boom lowering operation amount within the range from the stopping boom lowering velocity VD1 to the compaction boom lowering velocity VD2, and thus possible shock caused by switching from the stopping boom lowering velocity VD1 to the compaction boom lowering velocity VD2 is prevented, and the operator is prevented from feeling uncomfortable with operation. Accordingly, the present embodiment also allows the operator to perform the compaction work as intended.

Third Embodiment

Another table can be used instead of the second limiting velocity table (third velocity) used by the boom lowering limiting velocity calculation section 43d according to the first embodiment in computing the second boom lowering velocity. For example, the second limiting velocity table can be matched with a normal target velocity table defining a correlation between the operation amount and the cylinder velocity which correlation prescribes the velocity of the boom cylinder during boom lowering on the basis of the boom lowering operation amount of the operation device. An example in that case will be described with reference to FIGS. 16, 17, and 18.

Figure 16:
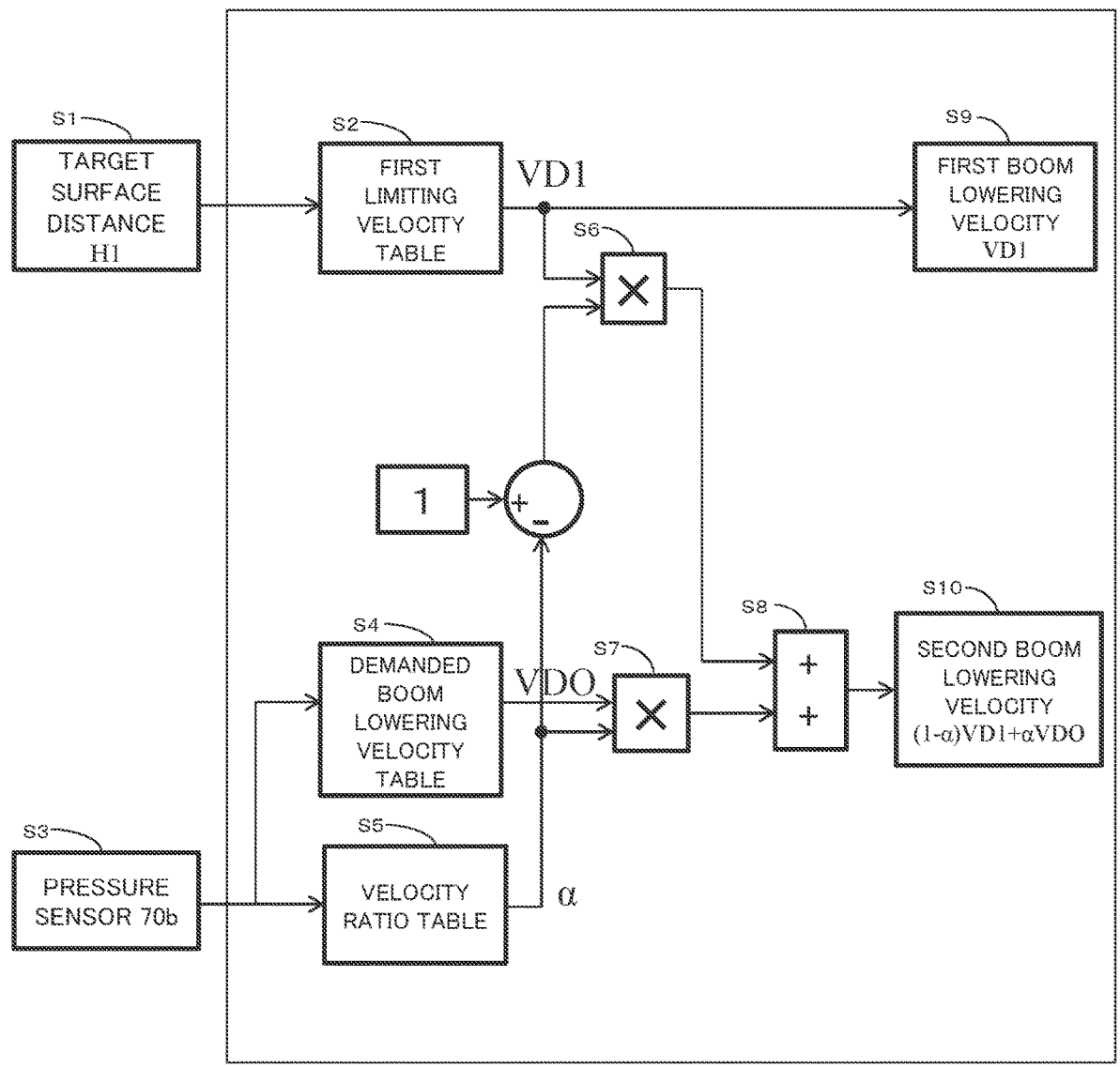
FIG. 16 is a control block diagram of the boom lowering limiting velocity calculation section 43d according to a third embodiment.
Figure 17:
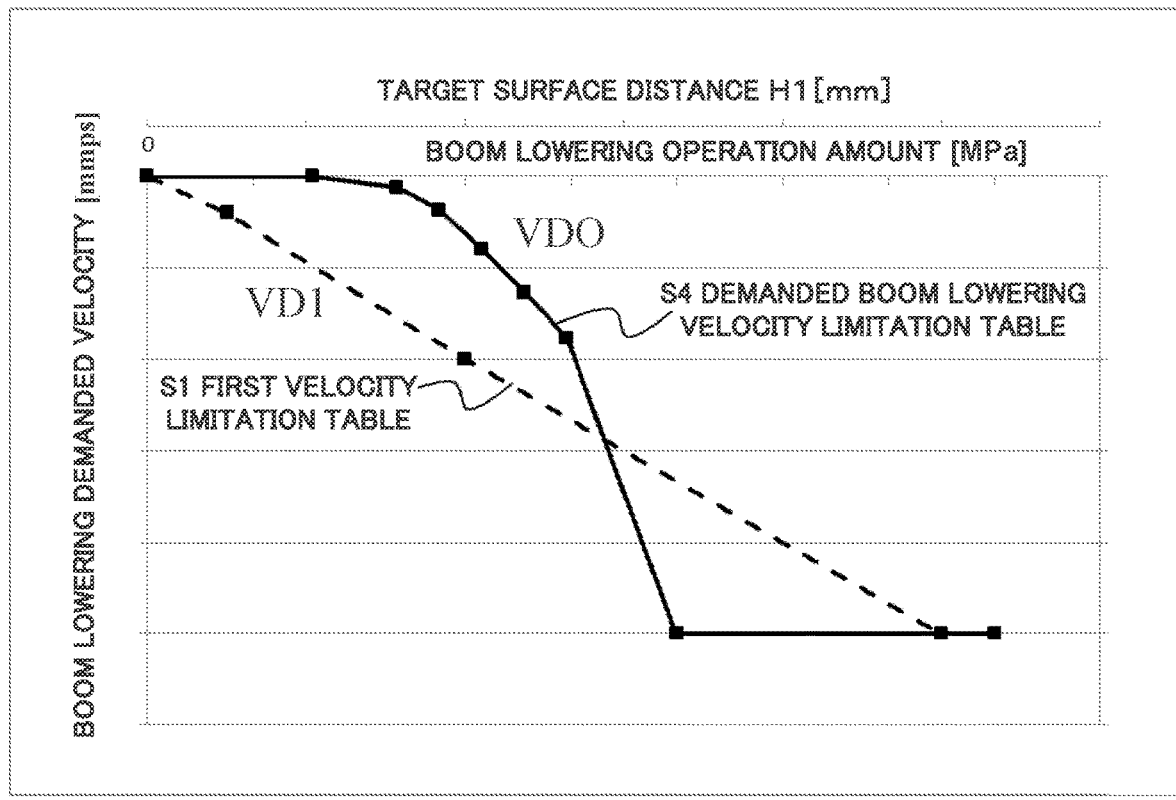
FIG. 17 is a diagram illustrating an example of a demanded boom lowering velocity table.

FIG. 16 is a control block diagram of the boom lowering limiting velocity calculation section 43d according to a third embodiment. Components in FIG. 16 that are the same as the corresponding components in FIG. 10 are assigned the same reference symbols. In the present embodiment, instead of the second limiting velocity table, a demanded boom lowering velocity table (S4) that converts the boom lowering operation amount input to the operation device 45b by the operator (detection value from the pressure sensor 70b (S3)) into a boom cylinder velocity demanded by the operator (demanded boom lowering velocity VDO) is used. FIG. 17 is a diagram illustrating an example of the demanded boom lowering velocity table. The demanded boom lowering velocity table in FIG. 17 is set such that the velocity of the boom cylinder 5 in the lowering direction monotonically increases toward the maximum value according to an increase in the boom lowering operation amount. In other words, the demanded boom lowering velocity table is set such that the velocity of the boom cylinder 5 in the lowering direction monotonically decreases toward zero according to the decrease in the boom lowering operation amount. Note that, in the example in FIG. 17, for reference, a first limiting velocity table that defines, on the horizontal axis, a relationship between the target surface distance H1 and the boom cylinder limiting velocity instead of the target surface distance H1 is also described.

The boom lowering limiting velocity calculation section 43d inputs, to the velocity ratio table (S5), the detection value from the pressure sensor 70b, to calculate the velocity ratio $\alpha$. The boom lowering limiting velocity calculation section 43d then adds together a value resulting from multiplication, by the first function $(1-\alpha)$, of the stopping boom lowering velocity VD1 output from the first limiting velocity table (S2) and a value resulting from multiplication, by the second function a, of the demanded boom lowering velocity VDO output from the demanded boom lowering velocity table (S4), and outputs the result of the addition as a second boom lowering velocity (S10). In this case, as the second boom lowering velocity, a boom cylinder velocity that increases as the boom lowering operation amount increases within the range from the stopping boom lowering velocity VD1 to the boom lowering velocity VDO with no velocity limitation is output. The boom lowering limiting velocity calculation section 43d configured as described above causes the boom lowering limiting velocity selection section 43f to execute processing as illustrated in FIG. 18.

Figure 18:
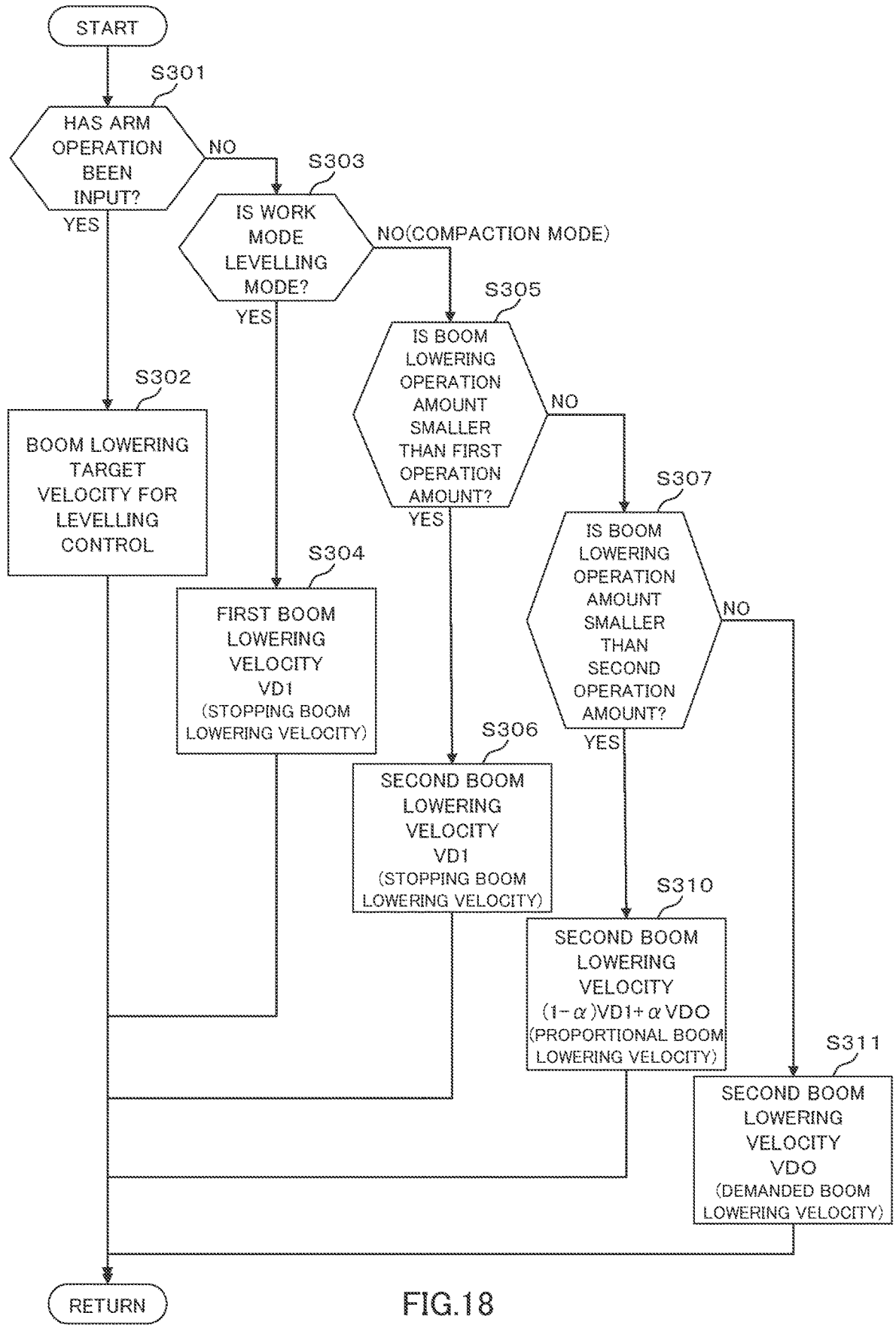
FIG. 18 is a flowchart of processing executed by the boom lowering limiting velocity selection section 43f according to the third embodiment.

FIG. 18 is a flowchart of processing executed by the boom lowering limiting velocity selection section 43f. Portions of processing in FIG. 18 that are the same as the corresponding portions of the processing in FIG. 13 are assigned the same reference symbols and will not be described below.

In step S310, the boom lowering limiting velocity selection section 43f outputs, to the target pilot pressure calculation section 43g, the second boom lowering velocity (second velocity) calculated by the boom lowering limiting velocity calculation section 43d. In this case, the boom lowering operation amount is equal to or larger than the first operation amount but smaller than the second operation amount, and thus $(1-\alpha)VD1+\alpha VDO$ (proportional boom lowering velocity) is output as the second boom lowering velocity.

In step S310, the boom lowering limiting velocity selection section 43f outputs, to the target pilot pressure calculation section 43g, the second boom lowering velocity (third velocity) calculated by the boom lowering limiting velocity calculation section 43d. In this case, the boom lowering operation amount is equal to or larger than the second operation amount, and thus VDO (demanded boom lowering velocity) is output as the second boom lowering velocity.

This configuration also produces effects similar to the effects of the first embodiment. For example, in a case where the boom lowering operation amount is equal to or larger than the first operation amount but smaller than the second operation amount, a boom lowering limiting velocity that increases in proportion to the boom lowering operation amount within the range from the stopping boom lowering velocity VD1 (first velocity) to the demanded boom lowering velocity VDO (third velocity) (proportional boom lowering velocity: $(1-\alpha)VD1+\alpha VDO$) is output. The boom lowering velocity transitions smoothly according to the boom lowering operation amount within the range from the stopping boom lowering velocity VD1 to the demanded boom lowering velocity VDO, and thus possible shock caused by switching from the stopping boom lowering velocity VD1 to the demanded boom lowering velocity VDO is prevented, and the operator is prevented from feeling uncomfortable with operation. Accordingly, the operator can perform the compaction work as intended. Note that a feature of the present embodiment is that, in a case where the boom lowering operation amount is equal to or larger than the second operation amount, the demanded boom lowering velocity is used, preventing velocity limitation as that in the first embodiment from being imposed.

Fourth Embodiment

Figure 19:
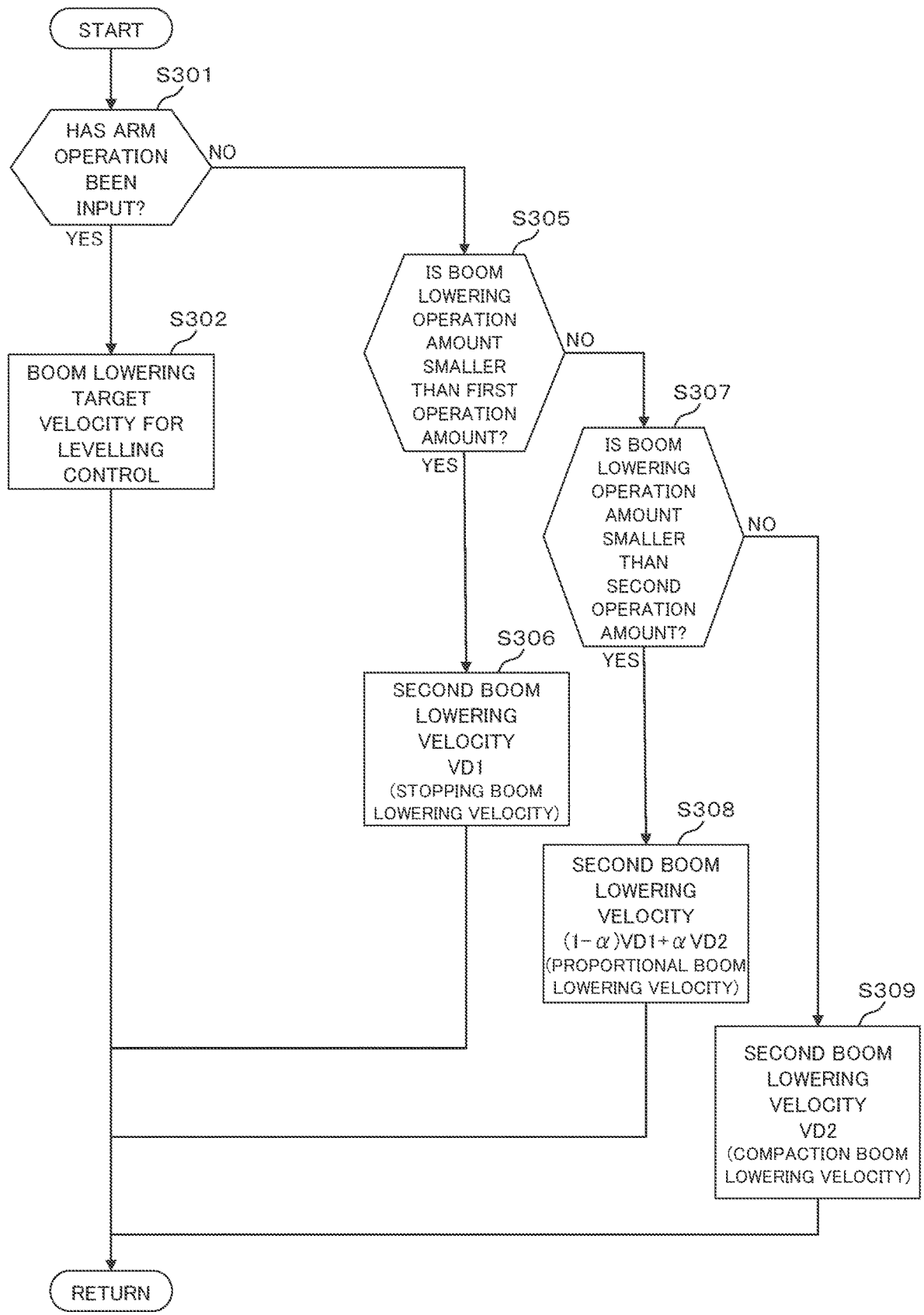
FIG. 19 is a flowchart of processing executed by the boom lowering limiting velocity selection section 43f according to a fourth embodiment.

The work mode selection switch 96 may be omitted from the first embodiment to eliminate the function of switching the work mode, allowing a compaction mode to be selected constantly. In this case, the icon of the work mode selection switch 96 is not displayed on the display device 53a. This is equivalent to constant output of a levelling mode flag of 0, and thus the boom lowering limiting velocity selection section 43f executes processing as illustrated in FIG. 19.

Fifth Embodiment

Figure 20:
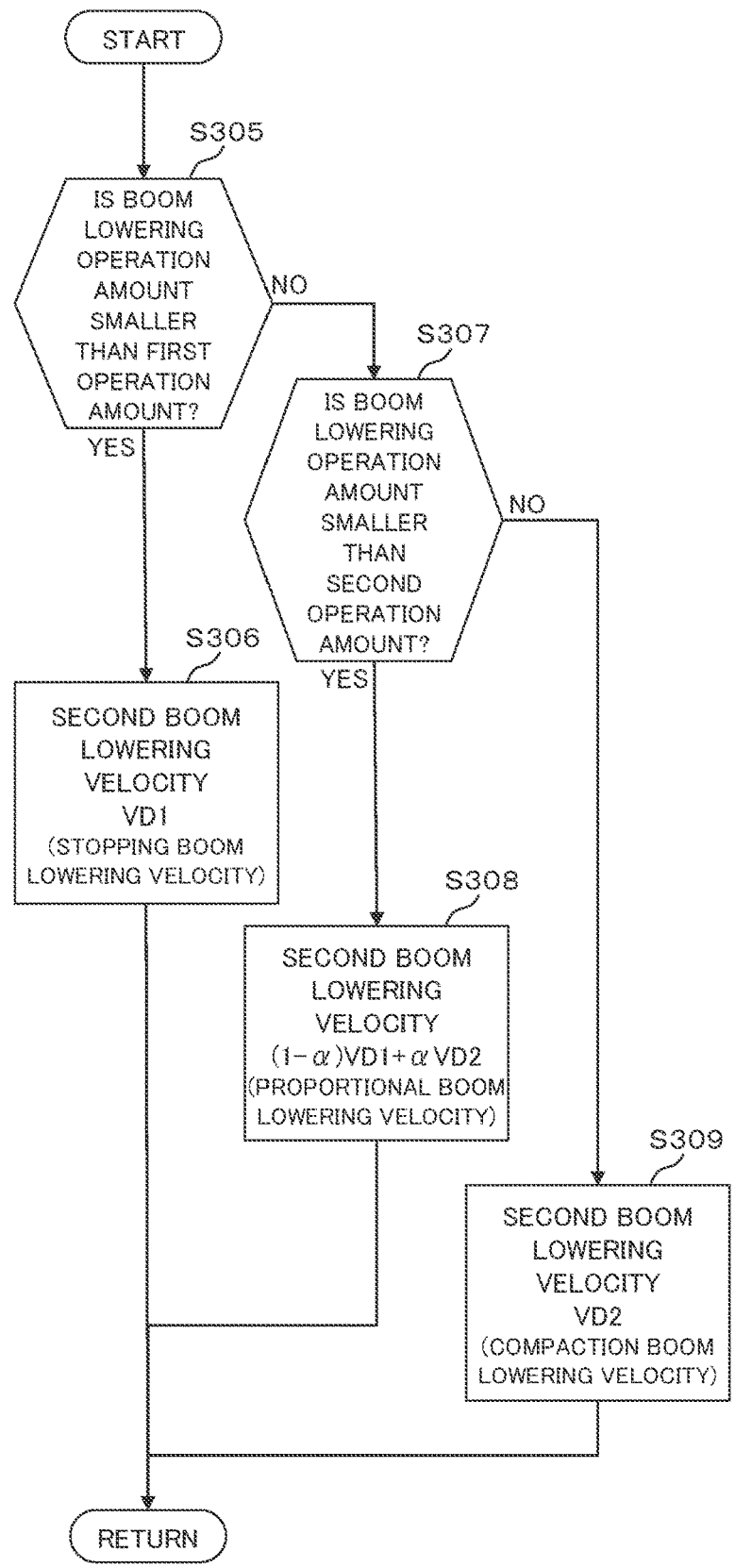
FIG. 20 is a flowchart of processing executed by the boom lowering limiting velocity selection section 43f according to a fifth embodiment.

The determination processing for the presence or absence of the arm operation and related processing may be omitted from the fourth embodiment. In this case, the boom lowering limiting velocity selection section 43f executes processing as illustrated in FIG. 20. Note that steps S308 and S309 in FIG. 20 can be changed to steps S310 and S311 in FIG. 18.

<Modifications>

Note that the present invention is not limited to the above-described embodiments and includes various modified examples without departing from the spirits of the present invention. For example, the present invention is not limited to the configuration including all of the components described above in the embodiments and includes a configuration with some of the components deleted. Additionally, some of the components according to one embodiment can be added to or replace components according to another embodiment.

In each of the above-described embodiments, the third velocity is the second limiting velocity VD2 (compaction boom lowering velocity) set to decrease according to the decrease in the target surface distance H1, and the demanded boom lowering velocity VDO set to decrease according to the decrease in the boom lowering operation amount of the operation device. However, the third velocity can have another value as long as the value is set to change according to one of the target surface distance and the boom lowering operation amount of the operation device.

Additionally, some or all of the components related to the above-described controller 40, and the functions of the components, processing executed by the components, and the like may be implemented by hardware (for example, logic executing the functions is designed using an integrated circuit). Additionally, the configuration related to the above-described controller 40 may be a program (software) implementing, when read out and executed by a calculation processing device (for example, the CPU), the functions related to the components of the controller. The information regarding the program can be stored in, for example, a semiconductor memory (flash memory, SSD, or the like), a magnetic storage device (hard disk drive or the like), and a recording medium (magnetic disk, optical disc, or the like).

Additionally, in the above description of the embodiments, control lines and information lines that are understood to be necessary for the description of the embodiments have been illustrated. However, not all of the control lines and information lines related to the product are necessarily illustrated. It may be assumed that substantially all of the components are actually connected to one another.

DESCRIPTION OF REFERENCE CHARACTERS

1: Front work device
8: Boom
9: Arm
10: Bucket
30: Boom angle sensor
31: Arm angle sensor
32: Bucket angle sensor
40: Controller
43a: Operation amount calculation section
43b: Posture calculation section
43c: Target surface calculation section 43*d*: Boom lowering limiting velocity calculation section
43*e*: Levelling target velocity calculation section
43*f*: Boom lowering limiting velocity selection section
43*g*: Target pilot pressure calculation section
43*h*: Valve command calculation section
45: Operation device (boom and arm)
46: Operation device (bucket and swing)
50: Work device posture sensor
51: Target surface setting device
52*a*: Operator operation sensor
53*a*: Display device
54, 55, 56: Solenoid proportional valve
81: Actuator control section
374*a*: Display control section
700: Target surface

The invention claimed is:

1. A work machine comprising:
an articulated work device including a boom and an arm;
a plurality of hydraulic actuators including a boom cylinder driving the boom, the plurality of hydraulic actuators driving the work device;
an operation device that gives an instruction on an operation of the work device in response to an operation by an operator; and
a controller controlling, during the operation of the operation device, at least one of the plurality of hydraulic actuators such that the work device is positioned on or above a predetermined target surface, the controller controlling a velocity of the boom cylinder on the basis of a boom lowering operation amount of the operation device, wherein
the controller
calculates, as a limiting velocity for the boom cylinder, a first velocity set to decrease according to a decrease in a distance between the target surface and the work device when the boom lowering operation amount of the operation device is smaller than a first operation amount, and
calculates a second velocity as a limiting velocity for the boom cylinder when the boom lowering operation amount of the operation device is equal to or larger than the first operation amount,
the second velocity is defined by a weighted average of the first velocity and a third velocity set to change according to one of the boom lowering operation amount of the operation device and the distance between the target surface and the work device, and is set such that an increase in the boom lowering operation amount reduces a weight for the first velocity while increasing a weight for the third velocity, and
when the velocity of the boom cylinder based on the boom lowering operation amount of the operation device is higher than the limiting velocity, the velocity of the boom cylinder is limited to the limiting velocity.

2. The work machine according to claim 1, wherein
the third velocity is a velocity set to decrease according to the decrease in the distance between the target surface and the work device, and is higher than the first velocity when the distance between the target surface and the work device is within a predetermined range in which machine control is executed.

3. The work machine according to claim 1, wherein
the third velocity is equal to the velocity of the boom cylinder based on the boom lowering operation amount of the operation device and is set to monotonically decrease according to a decrease in the boom lowering operation amount of the operation device.

4. The work machine according to claim 1, wherein
the controller outputs the first velocity as the limiting velocity for the boom cylinder when the boom lowering operation amount of the operation device is smaller than the first operation amount, outputs the second velocity as the limiting velocity for the boom cylinder when the boom lowering operation amount of the operation device is equal to or larger than the first operation amount but smaller than a second operation amount larger than the first operation amount, and outputs the third velocity as the limiting velocity for the boom cylinder when the boom lowering operation amount of the operation device is equal to or larger than the second operation amount.

5. The work machine according to claim 4, further comprising:
a switch for selecting one of a first mode and a second mode as a work mode to be implemented by the work device, wherein
in a case where the first mode is selected by the switch, the controller outputs the first velocity as the limiting velocity for the boom cylinder regardless of a magnitude of the boom lowering operation amount of the operation device, and
in a case where the second mode is selected by the switch, the controller outputs the first velocity as the limiting velocity for the boom cylinder when the boom lowering operation amount of the operation device is smaller than the first operation amount, outputs the second velocity as the limiting velocity for the boom cylinder when the boom lowering operation amount of the operation device is equal to or larger than the first operation amount but smaller than the second operation, and outputs the third velocity as the limiting velocity for the boom cylinder when the boom lowering operation amount of the operation device is equal to or larger than the second operation amount.

6. The work device according to claim 5, wherein
when an operation instruction is provided to the arm using the operation device, the controller calculates a target velocity for the boom cylinder for controlling the boom cylinder to position the work device on or above the target surface, and
when the operation instruction is provided to the arm using the operation device, the controller controls the boom cylinder on a basis of the target velocity.

* * * * *